US012705004B2

(12) United States Patent
Endo

(10) Patent No.: US 12,705,004 B2
(45) Date of Patent: Aug. 11, 2026

(54) SERVER, MANAGEMENT SYSTEM, AND CONTROL METHOD THEREFOR

(71) Applicant: CANON KABUSHIKI KAISHA, Tokyo (JP)

(72) Inventor: Shinya Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 254 days.

(21) Appl. No.: 18/738,513

(22) Filed: Jun. 10, 2024

(65) Prior Publication Data

US 2024/0419372 A1 Dec. 19, 2024

(30) Foreign Application Priority Data

Jun. 13, 2023 (JP) ................................ 2023-096736

(51) Int. Cl.
*G06F 3/12* (2006.01)
*G06Q 30/0601* (2023.01)

(52) U.S. Cl.
CPC ............ *G06F 3/121* (2013.01); *G06F 3/1234* (2013.01); *G06F 3/1288* (2013.01); *G06Q 30/0617* (2013.01)

(58) Field of Classification Search
CPC ...... G06F 3/121; G06F 3/1234; G06F 3/1288; G06Q 30/0617
See application file for complete search history.

(56) References Cited

U.S. PATENT DOCUMENTS

2019/0094782 A1* 3/2019 Sato .................. G03G 21/1878

FOREIGN PATENT DOCUMENTS

JP 2019061056 A 4/2019

* cited by examiner

*Primary Examiner* — Christopher Wait
(74) *Attorney, Agent, or Firm* — Canon U.S.A., Inc. IP Division

(57) ABSTRACT

A server configured to communicate with a printing apparatus to which an ink cartridge integrated with a printhead is attached and an order system configured to perform processing for delivering a replacement ink cartridge in a case where a number of times of an ink remaining amount of the ink cartridge falls below a threshold for a prescribed number of times includes a transmission unit configured to transmit, to the order system, the ink remaining amount and an identifier of the ink cartridge received from the printing apparatus, and wherein, upon receiving information about a printhead error in the ink cartridge from the printing apparatus, the transmission unit transmits, to the order system, the ink remaining amount that falls below the threshold as the ink remaining amount of the ink cartridge for the prescribed number of times.

12 Claims, 23 Drawing Sheets

| CONSUMABLES ID (501) | COLOR (502) | PRODUCT CODE (503) | THRESHOLD (504) | NUMBER OF TRANSMISSIONS WITHOUT ERRORS AND VARIATIONS (505) | MODEL NAME (506) |
|---|---|---|---|---|---|
| 00000001 | BLACK | ZZZ7 | 5% | THREE TIMES | AAAA |
| 00000002 | COLOR | ZZZ8 | 5% | THREE TIMES | AAAA |
| 00000003 | BLACK | XXX1 | 10% | THREE TIMES | BBBB |
| 00000004 | CYAN | XXX2 | 10% | THREE TIMES | BBBB |
| 00000005 | MAGENTA | XXX3 | 10% | THREE TIMES | BBBB |
| 00000006 | YELLOW | XXX4 | 10% | THREE TIMES | BBBB |

Figures 9A, 9B:
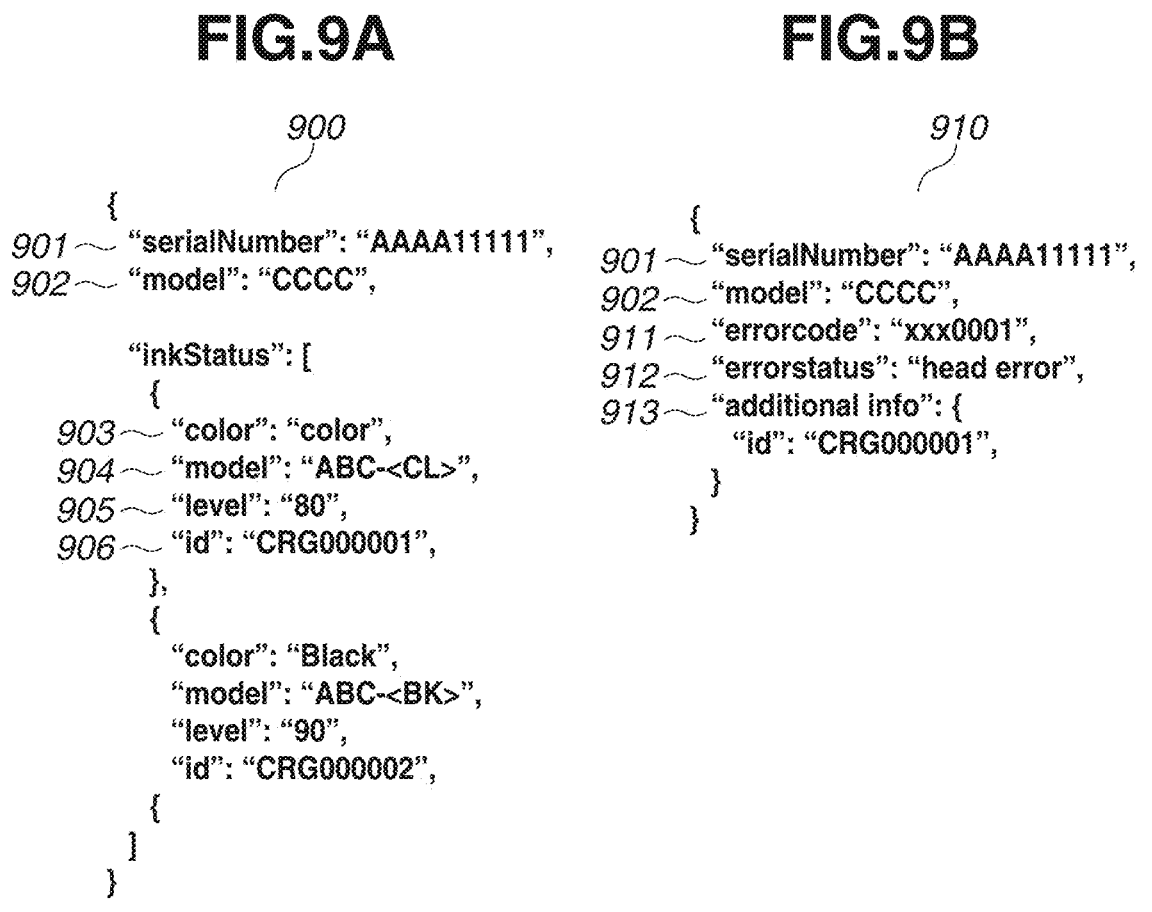

{
901 "serialNumber": "AAAA11111",
902 "model": "CCCC",

"inkStatus": [
{
903 "color": "color",
904 "model": "ABC-<CL>",
905 "level": "80",
906 "id": "CRG000001",
},
{
"color": "Black",
"model": "ABC-<BK>",
"level": "90",
"id": "CRG000002",
{
]
}

{
901 "serialNumber": "AAAA11111",
902 "model": "CCCC",
911 "errorcode": "xxx0001",
912 "errorstatus": "head error",
913 "additional info": {
"id": "CRG000001",
}
}

Figures 10A, 10B:
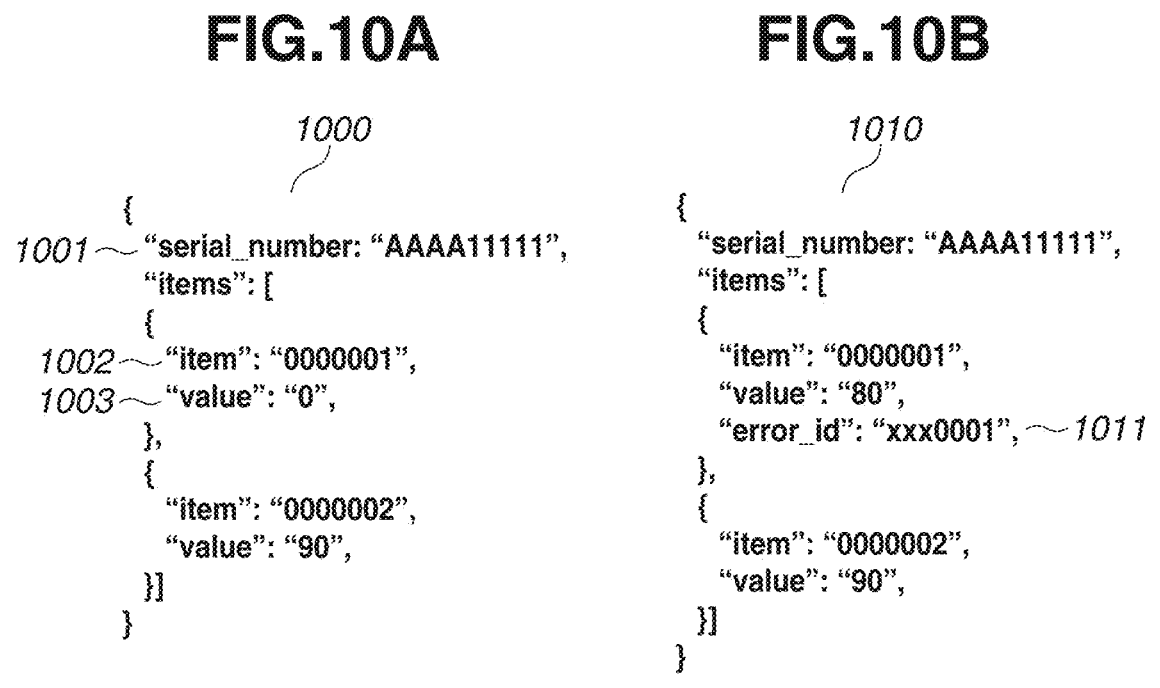

{
"serial_number: "AAAA11111",
"items": [
{
"item": "0000001",
"value": "0",
},
{
"item": "0000002",
"value": "90",
}]
}

{
"serial_number: "AAAA11111",
"items": [
{
"item": "0000001",
"value": "80",
"error_id": "xxx0001",
},
{
"item": "0000002",
"value": "90",
}]
}

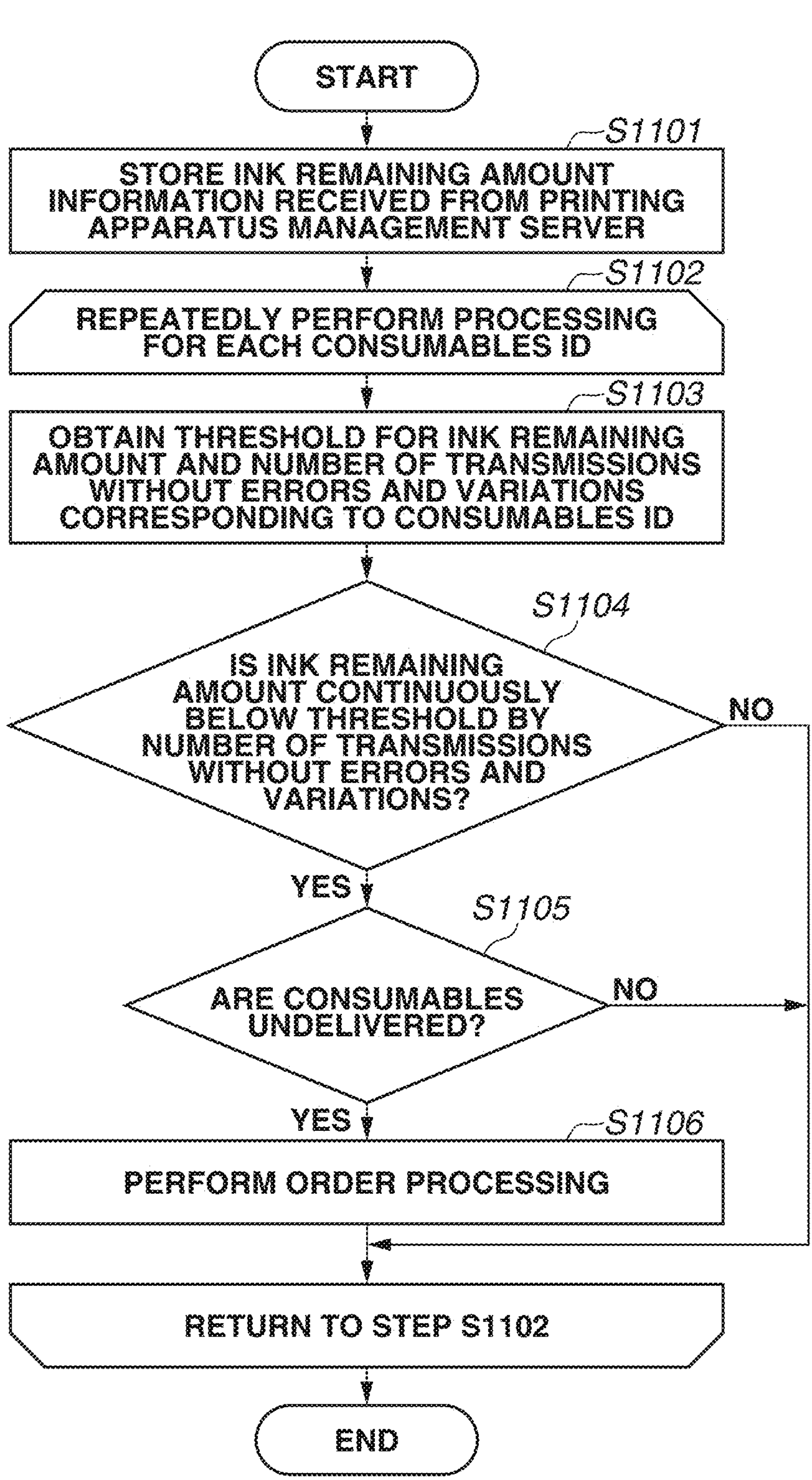
FIG.11
START
S1101
STORE INK REMAINING AMOUNT INFORMATION RECEIVED FROM PRINTING APPARATUS MANAGEMENT SERVER
S1102
REPEATEDLY PERFORM PROCESSING FOR EACH CONSUMABLES ID
S1103
OBTAIN THRESHOLD FOR INK REMAINING AMOUNT AND NUMBER OF TRANSMISSIONS WITHOUT ERRORS AND VARIATIONS CORRESPONDING TO CONSUMABLES ID
S1104
IS INK REMAINING AMOUNT CONTINUOUSLY BELOW THRESHOLD BY NUMBER OF TRANSMISSIONS WITHOUT ERRORS AND VARIATIONS?
NO
YES
S1105
ARE CONSUMABLES UNDELIVERED?
NO
YES
S1106
PERFORM ORDER PROCESSING
RETURN TO STEP S1102
END

| SERIAL NUMBER (1201) | CONSUMABLES ID (1202) | RECEIPT TIME (1203) | INK REMAINING AMOUNT (1204) |
|---|---|---|---|
| AAAA1111 | 00000011 | 2022/10/13 10:00:13.000 | 90% |
| AAAA1111 | 00000011 | 2022/10/13 10:00:11.000 | 80% |
| AAAA1111 | 00000011 | 2022/10/13 10:00:10.000 | 80% |
| AAAA1111 | 00000011 | 2022/10/12 10:00:00.000 | 80% |
| AAAA1111 | 00000011 | 2022/10/11 10:00:13.000 | 80% |
| AAAA1111 | 00000012 | 2022/10/13 10:00:10.000 | 0% |
| AAAA1111 | 00000012 | 2022/10/13 10:00:10.000 | 0% |
| AAAA1111 | 00000012 | 2022/10/13 10:00:10.000 | 0% |
| AAAA1111 | 00000012 | 2022/10/12 10:00:10.000 | 80% |
| AAAA1111 | 00000012 | 2022/10/11 10:00:10.000 | 80% |

| SERIAL NUMBER (1301) | CONSUMABLES ID (1302) | PRODUCT CODE (1303) | ORDER STATUS (1304) |
|---|---|---|---|
| AAAA1111 | 0000001 | ZZZ7 | DELIVERED |
| AAAA1111 | 0000002 | ZZZ8 | UNDELIVERED |

| USER ID | MAIL ADDRESS | ADDRESS FOR DELIVERY |
|---|---|---|
| USER0001 | user1@mail.com | XX-XXX, OTA WARD, TOKYO |

| SERIAL NUMBER | USER ID |
|---|---|
| AAAA1111 | USER0001 |

| MESSAGE ID (1601) | RECEIPT TIME (1602) | SERIAL NUMBER (1603) | TITLE (1604) | MESSAGE (1605) | DISPLAY PERIOD (1606) | STATUS (1607) |
|---|---|---|---|---|---|---|
| 00000001 | 2022/10/1 10:10:30 | AAAA1111 | AUTOMATIC DELIVERY OF AAAA·· | INK CARTRIDGE IN USE·· | 2022/10/1 – 2022/10/30 | UNREAD |
| 00000002 | 2022/8/25 9:10:30 | BBBB2222 | PLEASE CHECK. | START XXX SERVICE·· | 2022/08/25 – 2022/09/25 | ALREADY-READ |

| ERROR CODE (2001) | MESSAGE (2002) |
| --- | --- |
| xxx0001 | FAILURE HAS OCCURRED IN INK CARTRIDGE. |
| | |

| SERIAL NUMBER (1201) | CONSUMABLES ID (1202) | RECEIPT TIME (1203) | INK REMAINING AMOUNT (1204) | ERROR ID (2301) |
|---|---|---|---|---|
| AAAA1111 | 00000001 | 2022/10/13 10:00:13.000 | 90% | xxx0001 |
| AAAA1111 | 00000001 | 2022/10/13 10:00:11.000 | 80% | |
| AAAA1111 | 00000001 | 2022/10/13 10:00:10.000 | 80% | |
| AAAA1111 | 00000001 | 2022/10/12 10:00:00.000 | 80% | |
| AAAA1111 | 00000001 | 2022/10/11 10:00:00.000 | 80% | |
| AAAA1111 | 00000002 | 2022/10/13 10:00:00.000 | 90% | |
| AAAA1111 | 00000002 | 2022/10/13 10:00:00.000 | 90% | |
| AAAA1111 | 00000002 | 2022/10/13 10:00:00.000 | 90% | |
| AAAA1111 | 00000002 | 2022/10/12 10:00:00.000 | 90% | |
| AAAA1111 | 00000002 | 2022/10/11 10:00:00.000 | 90% | |

SERVER, MANAGEMENT SYSTEM, AND CONTROL METHOD THEREFOR

BACKGROUND

Field of the Disclosure

The present disclosure relates to a server, a management system, and a control method therefor.

Description of the Related Art

In recent years, a wide variety of automatic consumables delivery services have been offered to users who use an image forming apparatus. The automatic consumables delivery services are services to which each image forming apparatus subscribes. In many automatic consumables delivery services, consumables are delivered to each user when the remaining amount of consumables in the image forming apparatus with which a contract has been concluded falls below a threshold.

Japanese Patent Application Laid-Open No. 2019-61056 discusses a technique for delivering consumables for replacement when the remaining amount of consumables falls below a threshold even in a case where the remaining amount of consumables cannot be accurately obtained in a system for delivering consumables.

However, the technique of the related art has an issue that an order for a replacement ink cartridge cannot be placed if an ink cartridge integrated with a printhead has trouble with the printhead before the remaining amount of ink falls below the threshold.

SUMMARY

According to an aspect of the present disclosure, a server configured to communicate with a printing apparatus to which an ink cartridge integrated with a printhead is attached and an order system configured to perform processing for delivering a replacement ink cartridge in a case where a number of times of an ink remaining amount of the ink cartridge falls below a threshold for a prescribed number of times includes a transmission unit configured to transmit, to the order system, the ink remaining amount and an identifier of the ink cartridge received from the printing apparatus, and wherein, upon receiving information about a printhead error in the ink cartridge from the printing apparatus, the transmission unit transmits, to the order system, the ink remaining amount that falls below the threshold as the ink remaining amount of the ink cartridge for the prescribed number of times.

Further features of the present disclosure will become apparent from the following description of exemplary embodiments with reference to the attached drawings.

BRIEF DESCRIPTION OF THE DRAWINGS

FIG. 4 is a block diagram illustrating an example of a hardware configuration of a printing apparatus.

FIG. 5 is a table illustrating consumables information stored in a retailer server and a printing apparatus management server.

FIGS. 9A and 9B are diagram each illustrating ink status information transmitted from the printing apparatus.

FIGS. 10A and 10B are diagrams each illustrating ink remaining amount information transmitted from the printing apparatus management server to the retailer server.

FIG. 11 is a flowchart illustrating consumables order processing to be performed by the retailer server according to the first exemplary embodiment.

FIG. 12 is a diagram illustrating an example of an ink remaining amount history table held in the retailer server.

FIG. 13 is a diagram illustrating an example of a consumables order management table held in the retailer server.

FIG. 16 is a diagram illustrating an example of a message management table.

FIG. 20 is a diagram illustrating an example of a consumables error information management table held in the retailer server.

FIG. 23 is a diagram illustrating an example of an ink remaining amount history table held in the retailer server.

DESCRIPTION OF THE EMBODIMENTS

Exemplary embodiments of the present disclosure will be described in detail below with reference to the attached drawings. The following exemplary embodiments are not intended to limit the content of the present disclosure, and not all combinations of the features described in the exemplary embodiments are necessarily essential to the solution of the present disclosure.

<Configuration of Information Processing System>

Figure 1:
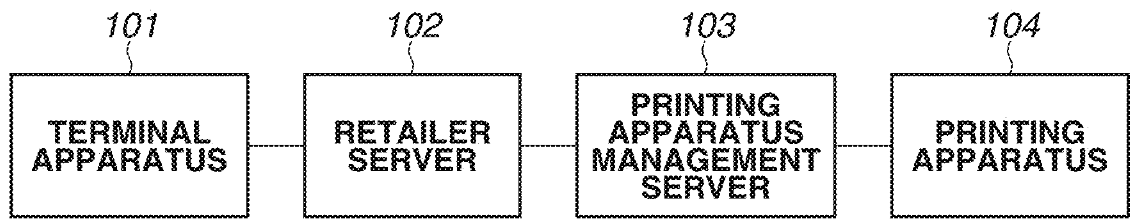
FIG. 1 is a block diagram illustrating a consumables order system according to a first exemplary embodiment.

FIG. 1 is a block diagram illustrating an example of a configuration of a consumables management system according to a first exemplary embodiment of the present disclosure.

As illustrated in FIG. 1, the consumables management system according to the first exemplary embodiment includes a terminal apparatus 101, a retailer server 102, a printing apparatus management server 103, and a printing apparatus 104. The consumables management system according to the first exemplary embodiment will be described in detail below with reference to FIG. 1.

The terminal apparatus 101 can be any information processing apparatus, such as a smartphone, a personal computer (PC), a tablet terminal, a mobile phone, or a personal digital assistant (PDA).

The printing apparatus 104 is a printer that forms (prints) an image on a recording medium, such as a print sheet, by ejecting a recording material, such as ink, onto the recording medium. The printing apparatus 104 may be a multifunctional printer (MFP) including a plurality of functions, such as a copying function, a facsimile (FAX) function, and a printing function, in an integrated manner. In the present exemplary embodiment, the printing apparatus 104 is an apparatus that performs printing by an inkjet printing method. However, the printing apparatus 104 is not limited to this example. For example, the printing apparatus 104 may be an apparatus that performs printing by an electrophotographic method or a heat sublimation method.

The terminal apparatus 101 is configured to communicate with the retailer server 102 via a network, such as the Internet. In the retailer server 102, information about the terminal apparatus 101 is associated with user information.

The printing apparatus 104 is configured to communicate with the printing apparatus management server 103 via a network, such as the Internet. The printing apparatus management server 103 is a server that offers a printing apparatus management service for managing the printing apparatus 104 owned by each user registered in the printing apparatus management server 103. In other words, in the printing apparatus management server 103, information about a plurality of printing apparatuses 104 is registered in association with corresponding user information. Examples of the information about the printing apparatus 104 include identification information (identifier) about the printing apparatus 104, such as a serial number, and a model name of the printing apparatus 104. The printing apparatus management server 103 obtains, for example, information about a remaining amount of consumables in the printing apparatus 104, and manages an operational status of the printing apparatus 104. The printing apparatus management server 103 is configured to communicate with the retailer server 102 via a network, such as the Internet.

The retailer server 102 constitutes an order system that obtains information about the remaining amount of consumables in the printing apparatus 104 from the printing apparatus management server 103 and performs order processing (processing for delivery) for placing an order for consumables for the user based on the obtained information about the remaining amount of consumables in the printing apparatus 104.

The communications described above are controlled via a HyperText Transfer Protocol (HTTP), an Extensible Messaging and Presence Protocol (XMPP), or the like. Protocols to be used are not limited to these examples, and any other protocols may be used.

<Terminal Apparatus>

Figure 2:
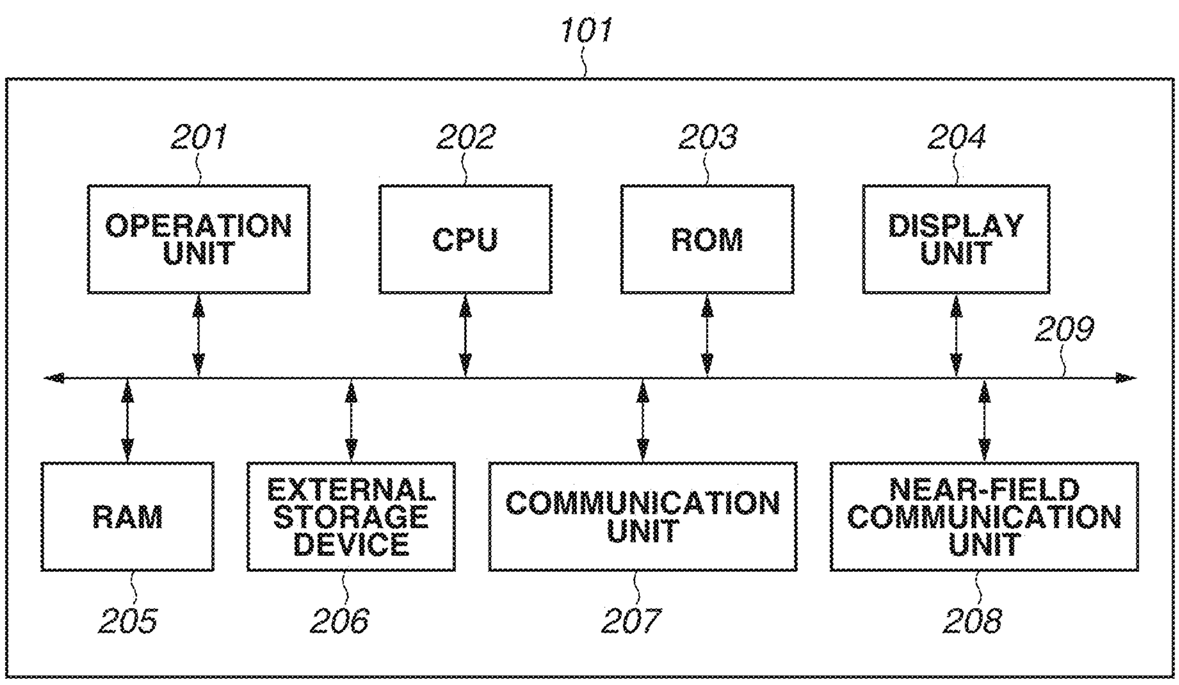
FIG. 2 is a block diagram illustrating an example of a hardware configuration of a terminal apparatus.

FIG. 2 is a block diagram illustrating an example of a hardware configuration of the terminal apparatus 101.

The terminal apparatus 101 includes an operation unit 201, a central processing unit (CPU) 202, a read-only memory (ROM) 203, a display unit 204, a random access memory (RAM) 205, an external storage device 206, a communication unit 207, and a near-field communication unit 208. The blocks described above are interconnected via, for example, an internal bus 209. In the configuration example illustrated in FIG. 2, a plurality of blocks may be configured as a single block, or one block may be divided into two or more blocks.

The CPU 202 is a processor that functions as a system control unit and controls an overall operation of the terminal apparatus 101 in an integrated manner.

The RAM 205 is composed of, for example, a static RAM (SRAM) that uses a backup power supply. The RAM 205 holds data using a primary battery for data backup (not illustrated), and thus can store data, such as program control variables, in a nonvolatile manner. The RAM 205 includes a memory area for storing setting information, management data, and the like for the terminal apparatus 101. The RAM 205 is also used as a main memory and a working memory for the CPU 202.

The ROM 203 stores fixed data such as programs to be executed by the CPU 202, data tables, and an operating system (OS) program.

The external storage device 206 stores programs to be executed by the CPU 202 and various data.

In the present exemplary embodiment, an application program for consumables delivery service is installed on the terminal apparatus 101, and the application program is stored the ROM 203 or the external storage device 206. An operation of the terminal apparatus 101 according to the present exemplary embodiment is implemented by, for example, processing in which the CPU 202 reads out programs stored in the ROM 203 or the external storage device 206 into the RAM 205 and executes the programs.

The operation unit 201 includes, for example, a keyboard and a mouse to be used for the user to perform various input operations.

The display unit 204 includes, for example, a light-emitting diode (LED) and a liquid crystal display (LCD), and displays a screen based on various display data. The display unit 204 may include, for example, a touch display, and may include a function for receiving various input operations from the user. In other words, the display unit 204 may be an interface for receiving a data input and an operation instruction from the user, and may be configured as an operation panel including a physical keyboard, buttons, and a touch panel.

The communication unit 207 includes a circuit and an antenna for establishing communication according to a predetermined wireless communication method. For example, the communication unit 207 can be wirelessly connected to an external access point. The communication unit 207 may also operate as an access point to be temporarily used. The communication unit 207 may operate according to a wireless communication method (Wireless Fidelity (Wi-Fi®)) of a wireless local area network (LAN) compliant with Institute of Electrical and Electronics Engineers (IEEE) 802.11 standard series, or may operate according to any other wireless communication method. The near-field communication unit 208 executes near-field communication with other apparatuses located within a predetermined near-field communication range from the terminal apparatus 101. The near-field communication unit 208 establishes communication by a wireless communication method different from that of the communication unit 207. For example, the near-field communication unit 208 operates according to Bluetooth® standard.

The configuration of the terminal apparatus 101 is not limited to the configuration example illustrated in FIG. 2, and may include, as necessary, blocks depending on functions that can be executed by the terminal apparatus 101.

<Configuration of Server>

Figure 3:
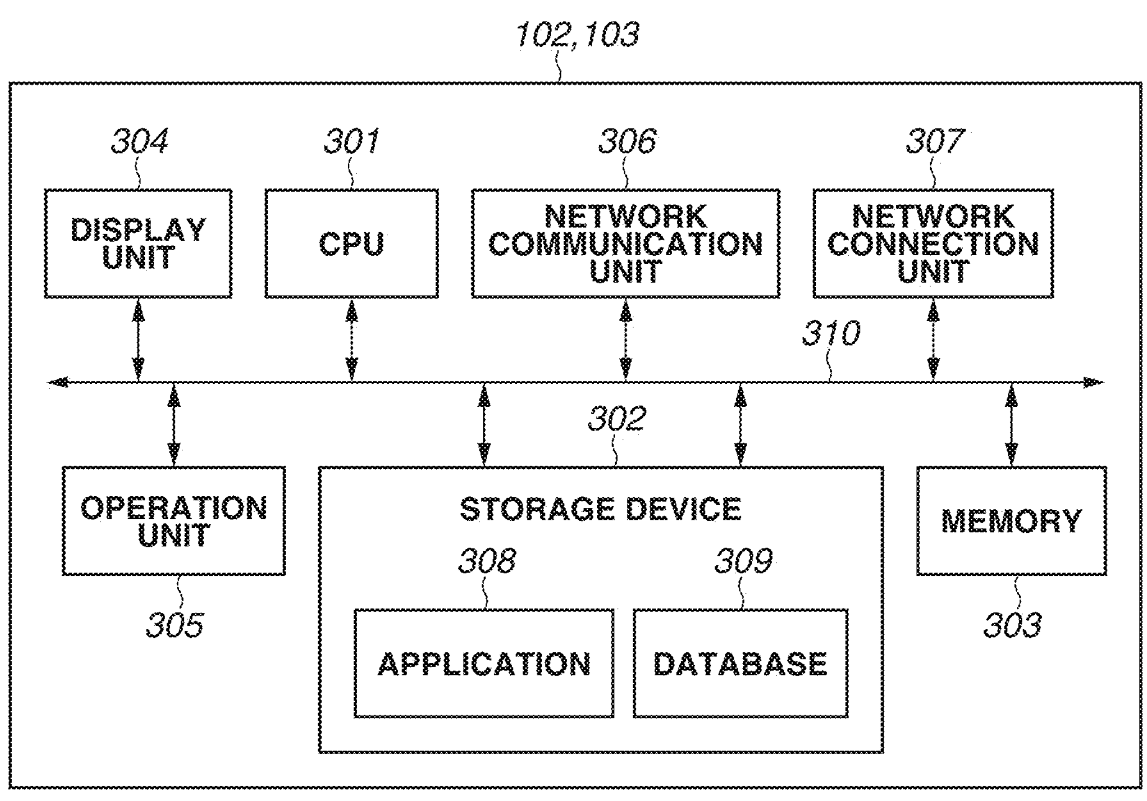
FIG. 3 is a block diagram illustrating an example of a hardware configuration of a server apparatus.

FIG. 3 is a block diagram illustrating an example of a hardware configuration of each of the retailer server 102 and the printing apparatus management server 103. The present exemplary embodiment is described assuming that the retailer server 102 and the printing apparatus management server 103 have the same configuration. However, the retailer server 102 and the printing apparatus management server 103 may have different configurations depending on the functions of each server.

A CPU 301 is a processor for controlling overall operations of the mounted devices in an integrated manner. A storage device 302 stores an application program 308 to be read out and executed by the CPU 301, a database 309, an OS, and various files.

A memory 303 includes a RAM or the like, and is used for the CPU 301 to, for example, temporarily store data and perform buffering. An operation of each of the retailer server 102 and the printing apparatus management server 103 according to the present exemplary embodiment is implemented by, for example, processing in which the CPU 301 of each server reads out programs stored in the storage device 302 into the memory 303 and executes the programs.

A display unit 304 includes, for example, an LED and an LCD, and displays a screen based on various display data.

An operation unit 305 includes, for example, a keyboard and a mouse to be used for the user to perform various input operations.

A network communication unit 306 is connected to a network, such as the Internet, via a network connection unit 307, and performs various communication operations. The network communication unit 306 has a configuration supporting network media, and is configured to establish communication, for example, via a wired LAN or a wireless LAN. For example, if the network communication unit 306 supports the wired LAN, the network connection unit 307 functions as a connector for connecting a cable for the wired LAN. If the network communication unit 306 supports the wireless LAN, the network connection unit 307 functions as an antenna. The network connection unit 307 may support both the wired LAN and the wireless LAN.

The blocks described above are interconnected via, for example, a bus 310. In the configuration example illustrated in FIG. 3, a plurality of blocks may be configured as a single block, or one block may be divided into two or more blocks.

The configuration of each of the retailer server 102 and the printing apparatus management server 103 is not limited to the configuration example illustrated in FIG. 3, and may include, as necessary, blocks depending on functions that can be executed by the retailer server 102 or the printing apparatus management server 103.

Each of the retailer server 102 and the printing apparatus management server 103 may be implemented by a single computer, or may be implemented by a plurality of computers. For example, the retailer server 102 and the printing apparatus management server 103 may be implemented by using a cloud computing technique.

In the database 309, a database for each of the retailer server 102 and the printing apparatus management server 103 is constructed.

In the retailer server 102, a database of consumables as illustrated in FIG. 5 to be described below, a database storing information about an ink remaining amount received from the printing apparatus management server 103 as illustrated in FIG. 12, and a database used to manage a consumables order status as illustrated in FIG. 13 are constructed. In the retailer server 102, a database in which authentication information (first authentication information) for accessing the printing apparatus management server 103, information about the terminal apparatus 101, login user information for the consumables delivery service offered by the retailer server 102, and information about the printing apparatus 104 are associated with each other is also constructed.

In the printing apparatus management server 103, a database of consumables as illustrated in FIG. 5 to be described below is constructed, like in the retailer server 102. In the printing apparatus management server 103, a database in which authentication information (second authentication information) for accessing the retailer server 102, login user information for the printing apparatus management server 103, and information about the printing apparatus 104 corresponding to the login user are associated with each other is also constructed. The first authentication information stored in the database of the retailer server 102 is information issued by the printing apparatus management server 103, and the printing apparatus management server 103 stores the issued first authentication information in the database.

In the present exemplary embodiment, the databases as described above are constructed in each of the retailer server 102 and the printing apparatus management server 103, and thus, the consumables management system for consumables for the printing apparatus 104 to be managed by a printing apparatus management system is implemented.

Each user registered in the printing apparatus management system provided by the printing apparatus management server 103 may be hereinafter also referred to as a login user. In the present exemplary embodiment, the login user corresponds to the user of the terminal apparatus 101.

<Configuration of Printing Apparatus>

Figure 4:
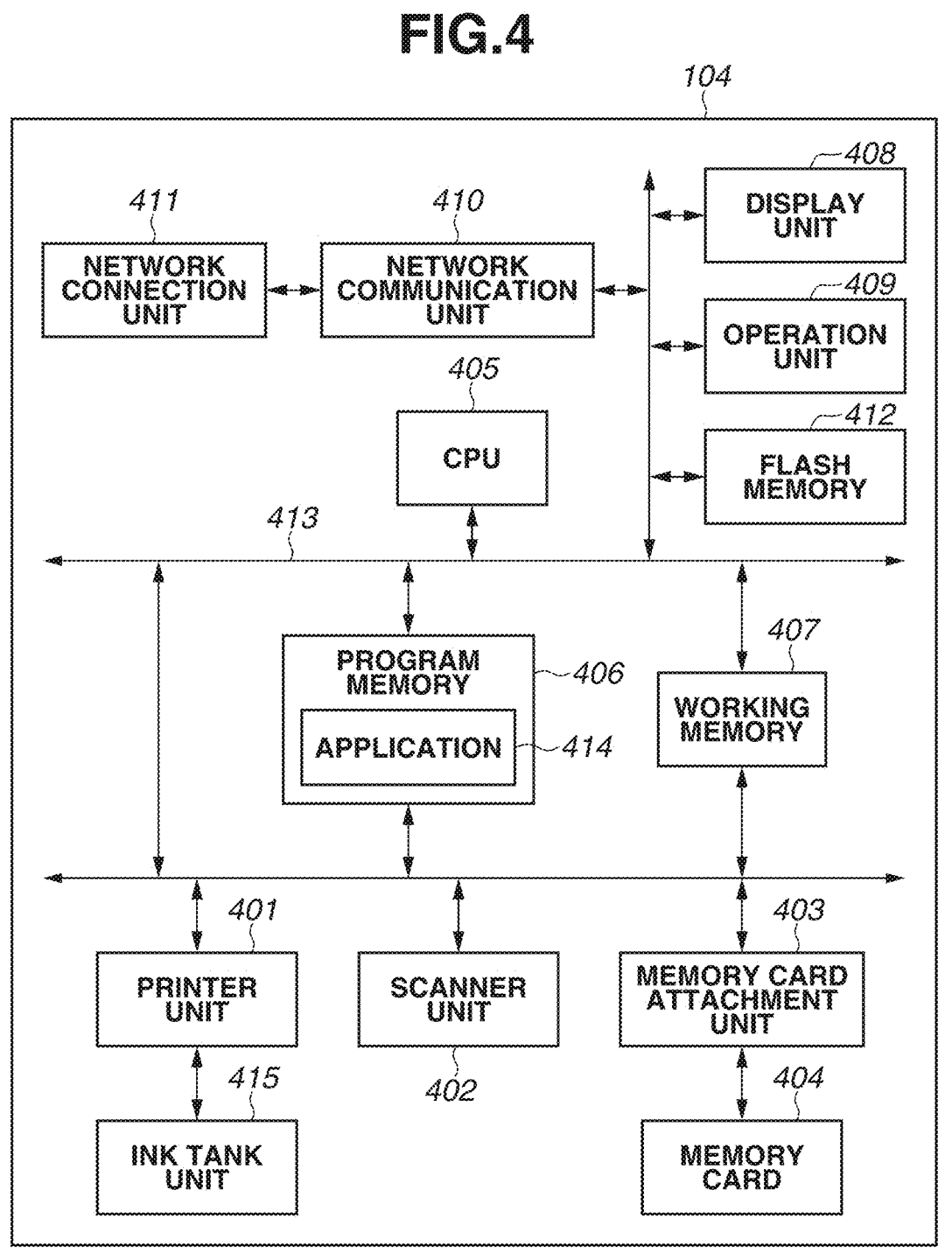

FIG. 4 is a block diagram illustrating an example of a hardware configuration of the printing apparatus 104. FIG. 4 illustrates an example where the printing apparatus 104 is configured as an MFP.

A printing function of the printing apparatus 104 is implemented by a printer unit 401. A scanner function of the printing apparatus 104 is implemented by a scanner unit 402. A storage function of the printing apparatus 104 is implemented by a memory card attachment unit 403 and a memory card 404.

The printer unit 401 executes printing based on, for example, image data received from an external apparatus or image data stored in the memory card 404. The printer unit 401 stores consumables information, including ink information, such as an ink remaining amount, and sheet information, such as a sheet remaining amount. The printing apparatus 104 transmits printing apparatus status information, such as the ink remaining amount information, to the printing apparatus management server 103.

The scanner unit 402 optically scans a document set on a platen glass (not illustrated), converts the scanned image into electronic data, and further converts the electronic data into a designated file format, thereby generating image data. Then, the scanner unit 402 transmits the generated image data to an external apparatus via a network, or stores the generated image data in a storage area of the memory card 404 or a hard disk drive (HDD) (not illustrated).

The copying function of the printing apparatus 104 is implemented by processing in which the scanner unit 402 transfers the image data generated by scanning a document set on the platen glass to the printer unit 401, and the printer unit 401 prints an image based on the image data on a print sheet.

The memory card 404 attached to the memory card attachment unit 403 stores various file data. The file data can be read out from an external apparatus via a network and can be edited. The file data can also be stored in the memory card 404 from an external apparatus via a network.

The printing apparatus 104 further includes a CPU 405, a program memory 406, a working memory 407, a display unit 408, an operation unit 409, a network communication unit 410, a network connection unit 411, and a flash memory 412.

The CPU 405 is a processor for controlling each unit of the printing apparatus 104 in an integrated manner. The program memory 406 includes a ROM or the like, and stores various program codes and an application 414 for communicating with the printing apparatus management server 103. The application 414 includes various application programs for implementing functions for, for example, accessing the printer unit 401 to obtain consumables information, such as ink information and sheet information. The working memory 407 includes a RAM or the like, temporarily stores image data and the like during execution of each service, and performs buffering. An operation of the printing apparatus 104 according to the present exemplary embodiment is implemented by, for example, processing in which the CPU 405 reads out programs stored in the program memory 406 into the working memory 407 and executes the programs.

The display unit 408 includes, for example, an LED and an LCD, and displays a screen based on various display data. The operation unit 409 includes a switch to be used for the user to perform various input operations.

The network communication unit 410 is connected to a network, such as the Internet, via the network connection unit 411, and performs various communication operations. The network communication unit 410 has a configuration supporting network media, and is configured to establish communication, for example, via a wired LAN or a wireless LAN. For example, if the network communication unit 410 supports the wired LAN, the network connection unit 411 functions as a connector for connecting a wired LAN cable. If the network communication unit 410 supports the wireless LAN, the network connection unit 411 functions as an antenna. The network connection unit 411 may support both the wired LAN and the wireless LAN. In the present exemplary embodiment, for example, the network communication unit 410 supports the wireless LAN and is connectable to an access point according to the wireless communication method of the wireless LAN compliant with IEEE 802.11 standard series.

The flash memory 412 is a nonvolatile memory for storing image data and the like received by the network communication unit 410.

If an ink cartridge mounted on an ink tank unit 415 runs out of ink, or if the remaining amount of ink in the ink cartridge is extremely small, the ink cartridge may be replaced with another ink cartridge by the user. If the ink cartridge mounted on the ink tank unit 415 is a cartridge integrated with a printhead, the ink cartridge may also be replaced with another ink cartridge by the user in a case where the printhead fails to operate properly and printing cannot be performed. In other words, the ink cartridge mounted on the ink tank unit 415 according to the present exemplary embodiment is one type of consumables to be replaced with a replacement ink cartridge if the ink cartridge runs out of ink, or if the printhead does not operate properly.

The blocks described above are interconnected via, for example, a bus 413. In the configuration example illustrated in FIG. 4, a plurality of blocks may be configured as a single block, or one block may be divided into two or more blocks. The configuration of the printing apparatus 104 is not limited to the configuration example illustrated in FIG. 4, and may include, as necessary, blocks depending on functions that can be executed by the printing apparatus 104.

<Advance Registration Process>

In the consumables management system according to the present exemplary embodiment, if the remaining amount of consumables in the printing apparatus 104 is continuously below a threshold, replacement consumables are delivered to the user. An administrator of the consumables management system registers consumables information about the printing apparatus 104 in the retailer server 102 in advance. Information to be registered will be described below with reference to FIG. 5.

FIG. 5 is a diagram illustrating an example of information to be registered in the database 309 of the retailer server 102.

Consumables information 500 includes items 501 to 506.

The item 501 indicates a consumables identification (ID) as a value (identifier) uniquely given to each ink cartridge attachment portion of the printing apparatus 104.

The item 502 indicates an ink color. The item 503 indicates a product code for each ink cartridge. The item 506 indicates a model name of the printing apparatus 104.

FIG. 5 illustrates an example of information about consumables ID/color/product code for each of black and color ink cartridges that can be attached to the printing apparatus 104 with a model name “AAAA”. In other words, the printing apparatus 104 with the model name “AAAA” is a printing apparatus to which ink tanks for two colors can be attached. FIG. 5 also illustrates an example of information about consumables ID/color/product code for each of black, cyan, magenta, and yellow ink cartridges that can be attached to the printing apparatus 104 with a model name “BBBB”. In other words, the printing apparatus 104 with the model name “BBBB” is a printing apparatus to which ink tanks for four colors can be attached.

The item 504 indicates a threshold for determining a low level of the remaining amount of ink in each ink tank at the portion of the printing apparatus 104 to which the ink cartridge is attached. The item 505 indicates a reference number of times set to determine whether the remaining amount of ink in each ink tank is below the threshold without errors or variations depending on the number of times at which information about the remaining amount of ink in the ink tank that is below the threshold is continuously transmitted. In other words, in a case where information about the remaining amount of ink in the ink tank that is below the threshold is continuously transmitted the number of times equal to the value in the item 505, the retailer server 102 determines that the ink remaining amount has been low and executes reorder processing.

The items 504 and 505 are set for each consumables ID.

In the example illustrated in FIG. 5, a percentage with respect to a maximum capacity is used as a unit for the threshold, but instead any other unit may be used as long as the unit indicates an ink remaining amount. For example, a volume (milliliter, etc.) may be used as a unit for the threshold.

The consumables information 500 illustrated in FIG. 5 that is registered in the retailer server 102 in advance by the administrator of the consumables management system is also registered in the database 309 of the printing apparatus management server 103.

<Process of Registering Authentication Information>

Figure 6:
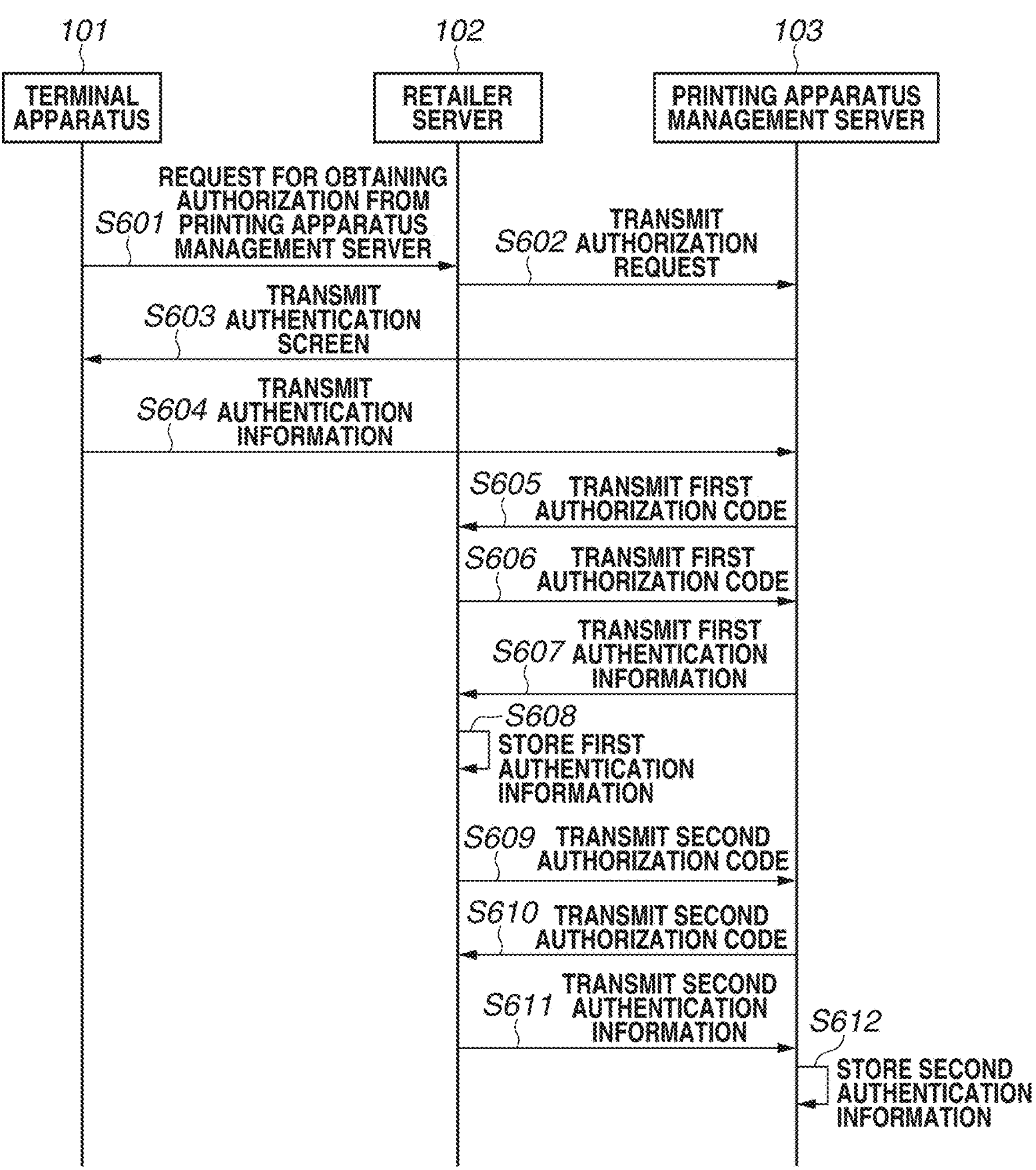
FIG. 6 is a sequence diagram for an operation for enabling mutual access between the retailer server and the printing apparatus management server.

FIG. 6 is a sequence diagram illustrating an operation for enabling mutual access between the retailer server 102 and the printing apparatus management server 103. Processing to be performed by the terminal apparatus 101 in this sequence diagram is implemented by the CPU 202 of the terminal apparatus 101 reading out programs stored in the ROM 203 into the RAM 205 and executing the programs. Processing to be performed by the retailer server 102 and the printing apparatus management server 103 is implemented by the CPU 301 of each server reading out programs stored in the storage device 302 into the memory 303 and executing the programs.

First, the user executes processing for obtaining the first authentication information to be used to access the printing apparatus management server 103 from the retailer server 102 using the terminal apparatus 101 that is associated in advance in a consumables automatic delivery service. Specifically, in step S601, the terminal apparatus 101 requests the retailer server 102 to obtain authorization from the printing apparatus management server 103 based on a user instruction. The user instruction to request for authorization may be executed on a screen provided by a local application installed on the terminal apparatus 101, or may be executed on a screen for a web page provided by the retailer server 102 via a web browser.

Upon receiving the request for obtaining the authorization of the printing apparatus management server 103 from the terminal apparatus 101, in step S602, the retailer server 102 transmits an authorization request (including information about the terminal apparatus 101) to an authorization endpoint of the printing apparatus management server 103.

Upon receiving the authorization request transmitted from the retailer server 102 in step S602 described above, in step S603, the printing apparatus management server 103 transmits authentication screen data for authentication to the terminal apparatus 101 designated in the authorization request.

Upon receiving the authentication screen data transmitted from the printing apparatus management server 103 in step S603 described above, the terminal apparatus 101 displays the authentication screen on the display unit 204.

The user inputs authentication information about the user registered in the printing apparatus management server 103 on the authentication screen displayed on the display unit 204 of the terminal apparatus 101. When the authentication information is input, in step S604, the terminal apparatus 101 transmits the input authentication information to the printing apparatus management server 103. Transmission of the authentication information allows the authorization request to be approved. As the authentication information, for example, a user ID and a password that are registered in advance for the user to log into the printing apparatus management service of the printing apparatus management server 103 are transmitted.

Upon receiving the authentication information transmitted from the terminal apparatus 101 in step S604 described above, the printing apparatus management server 103 verifies the authentication information. If the authentication is successful as a result of the verification, in step S605, the printing apparatus management server 103 transmits a first authorization code to the retailer server 102.

Upon receiving the first authorization code transmitted from the printing apparatus management server 103 in step S605 described above, in step S606, the retailer server 102 transmits the first authorization code to a token endpoint of the printing apparatus management server 103.

Upon receiving the first authorization code transmitted from the retailer server 102 in step S606 described above, in step S607, the printing apparatus management server 103 issues the first authentication information to the retailer server 102. The first authentication information is information to be used for the retailer server 102 to access the printing apparatus management server 103. The first authentication information is, for example, an access token or a refresh token.

Upon receiving the first authentication information issued by the printing apparatus management server 103 in step S607 described above, in step S608, the retailer server 102 stores the first authentication information in association with the information about the terminal apparatus 101 in the database 309.

Next, processing for obtaining the second authentication information to be used to access the retailer server 102 from the printing apparatus management server 103 is executed.

In step S609, the retailer server 102 transmits a second authorization code to the printing apparatus management server 103.

Upon receiving the second authorization code transmitted from the retailer server 102 in step S609 described above, in step S610, the printing apparatus management server 103 transmits the second authorization code to a second endpoint of the retailer server 102.

If the retailer server 102 has received the second authorization code transmitted from the printing apparatus management server 103 in step S610 described above and authorization processing is normally completed, then in step S611, the retailer server 102 issues and transmits the second authentication information to the printing apparatus management server 103. The second authentication information is authentication information to be used to access the retailer server 102.

Upon receiving the second authentication information transmitted from the retailer server 102 in step S611 described above, in step S612, the printing apparatus management server 103 stores the second authentication information, the first authentication information issued in step S607 described above, the information about the login user of the printing apparatus management server 103, and the information about the printing apparatus 104 corresponding to the login user in association with each other in the database 309. Examples of the login user information include the user ID and the password transmitted from the terminal apparatus 101 to the printing apparatus management server 103 in step S604 described above.

By the processing described above, the first authentication information, the second authentication information, the login user information, and the information about the printing apparatus 104 corresponding to the login user are associated with each other in the database 309 of the printing apparatus management server 103.

The retailer server 102 can access the printing apparatus management server 103 using the first authentication information, and the printing apparatus management server 103 can access the retailer server 102 using the second authentication information.

<Process of Registering Printing Apparatus with Retailer Server 102>

Next, processing for registering the printing apparatus 104 in the retailer server 102 will be described with reference to FIG. 7.

Figure 7:
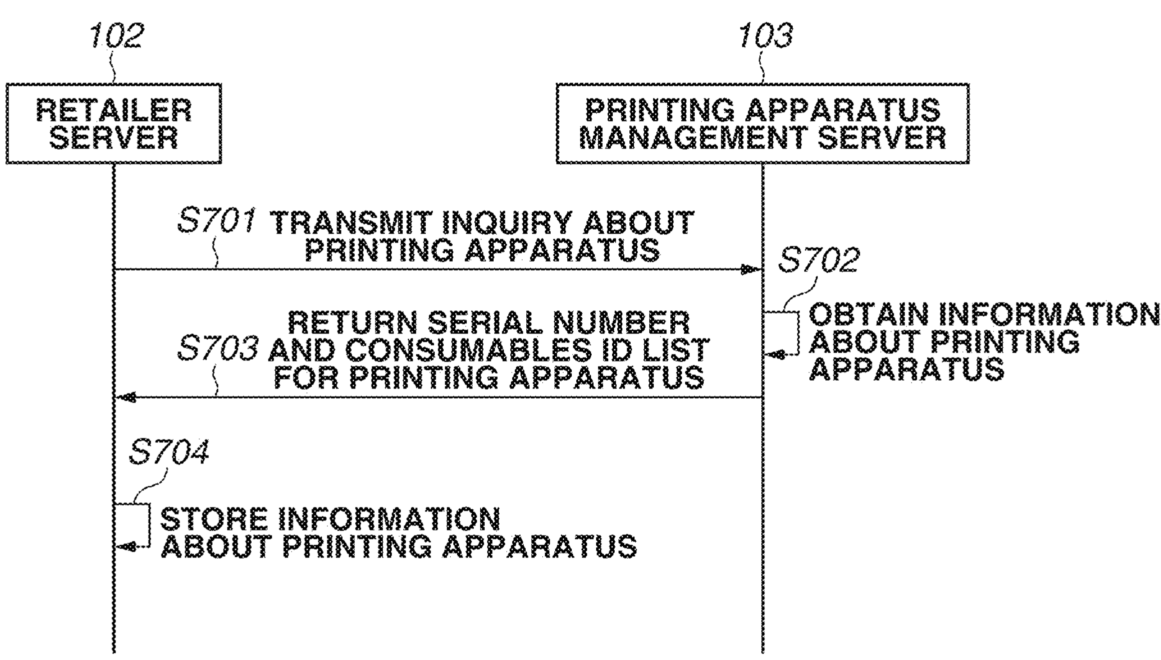
FIG. 7 is a sequence diagram illustrating an operation for newly registering a printing apparatus to operate in cooperation with the retailer server.

FIG. 7 is a sequence diagram illustrating an example of an operation for newly registering the printing apparatus 104 to operate in cooperation with the retailer server 102 in the retailer server 102. Processing to be performed by the retailer server 102 and the printing apparatus management server 103 in this sequence diagram is implemented by the CPU 301 of each server reading out programs stored in the storage device 302 into the memory 303 and executing the programs.

The processing illustrated in FIG. 7 is performed after the first authentication information is stored in the database 309 of the retailer server 102 in step S608 illustrated in FIG. 6.

In step S701, the retailer server 102 transmits an inquiry about the printing apparatus 104 registered in the printing apparatus management server 103 to the printing apparatus management server 103 using the first authentication information. The printing apparatus management server 103 that has received this inquiry identifies the login user of the printing apparatus management server 103 based on the first authentication information transmitted from the retailer server 102. In other words, the printing apparatus management server 103 identifies a user account to which the login user has logged in. In step S702, the printing apparatus management server 103 obtains information about the target printing apparatus 104 registered in association with the identified login user. The information about the target printing apparatus 104 obtained in step S702 includes identification information about the printing apparatus 104, such as a serial number, and a model name of the printing apparatus 104.

Next, the printing apparatus management server 103 obtains a list of consumables IDs (consumables ID list) in the information matching the model name of the printing apparatus 104 obtained in step S702 described above from the consumables information 500 illustrated in FIG. 5. In step S703, the printing apparatus management server 103 transmits the serial number of the printing apparatus 104 obtained in step S702 described above and the obtained consumables ID list to the retailer server 102.

In step S704, the retailer server 102 receives the serial number of the target printing apparatus 104 and the corresponding consumables ID list transmitted from the printing apparatus management server 103 in step S703 described above and stores the received serial number and consumables ID list. In step S704, the retailer server 102 stores the first authentication information transmitted in step S701 described above, the information about the terminal apparatus 101 associated with the first authentication information, and the serial number of the target printing apparatus 104 and the corresponding consumables ID list described above in association with each other in the database 309. By the processing illustrated in FIG. 7 described above, the information about the terminal apparatus 101, the first authentication information, and the information about the target printing apparatus 104 are associated with each other in the database 309 of the retailer server 102.

<Process of Transmitting Ink Remaining Amount Information According to First Exemplary Embodiment>

Next, a flow of processing for transmitting ink remaining amount information obtained by the printing apparatus management server 103 from the printing apparatus 104 to the retailer server 102 will be described with reference to FIG. 8.

Figure 8:
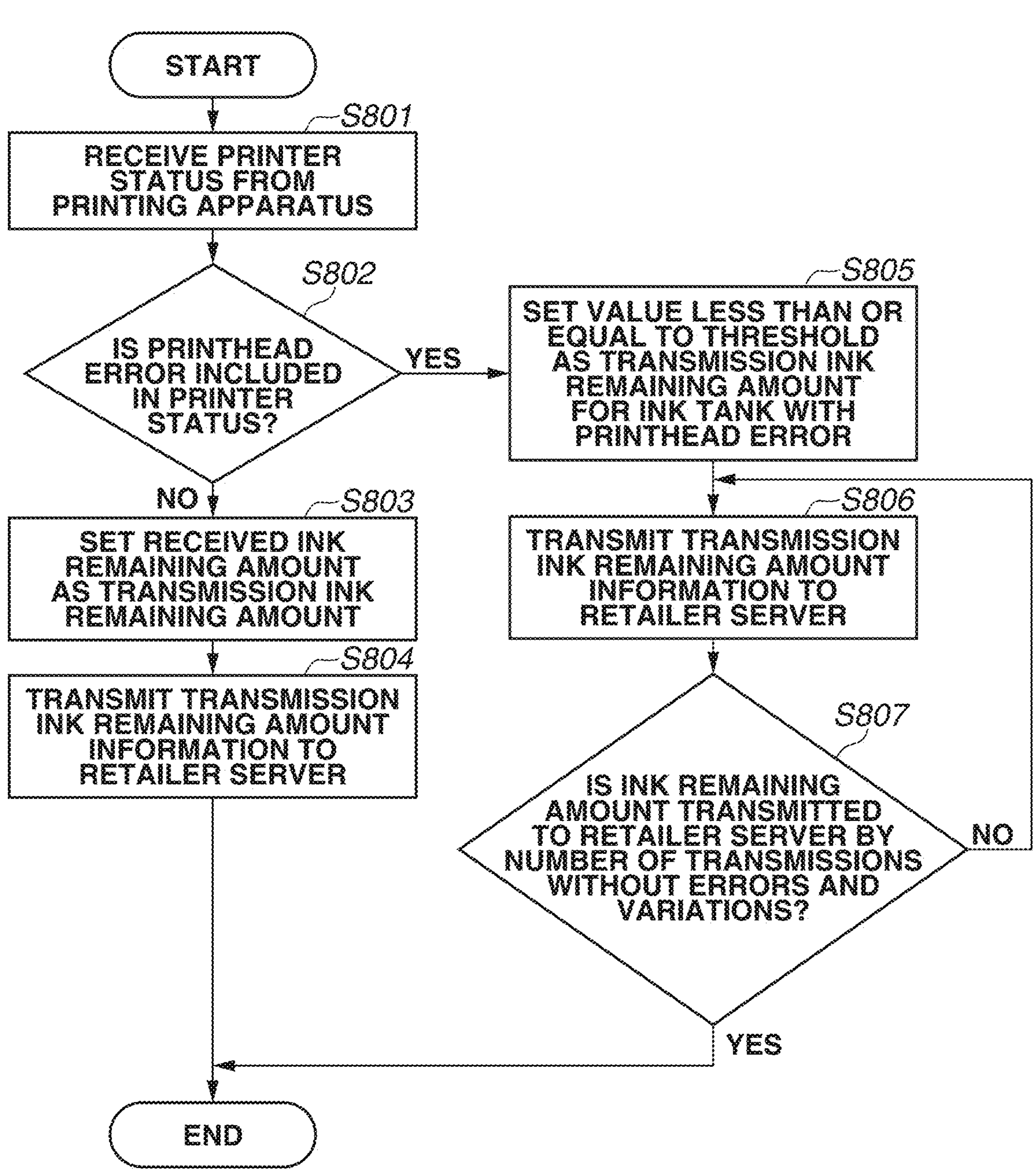
FIG. 8 is a flowchart illustrating ink remaining amount information transmission processing to be performed by the printing apparatus management server according to the first exemplary embodiment.

FIG. 8 is a flowchart illustrating an example of processing for transmitting ink remaining amount information obtained by the printing apparatus management server 103 from the printing apparatus 104 to the retailer server 102 according to the first exemplary embodiment. The processing illustrated in FIG. 8 is implemented by, for example, the CPU 301 of the printing apparatus management server 103 reading out programs stored in the storage device 302 into the memory 303 and executing the programs.

The processing illustrated in FIG. 8 is started, for example, when printer status information including an ink remaining amount is transmitted from the printing apparatus 104 at a timing when some operation is performed on the printing apparatus 104, for example, at a timing when printing processing or copying processing is executed by the printing apparatus 104, at a timing when the printing apparatus 104 is switched from a power-off state to a power-on state, or at a timing when a cover of the printing apparatus 104 is opened.

In step S801, upon receiving a printer status from the printing apparatus 104, the printing apparatus management server 103 extracts ink status information 900 and error status information 910 as illustrated in FIGS. 9A and 9B, respectively, from the received printer status. The printer status will now be described with reference to FIGS. 9A and 9B.

FIGS. 9A and 9B each illustrate an example of the printer status to be transmitted to the printing apparatus management server 103 from the printing apparatus 104.

The printer status to be transmitted to the printing apparatus management server 103 from the printing apparatus 104 includes the ink status information 900 and the error status information 910.

The ink status information 900 will now be described with reference to FIG. 9A.

The ink status information 900 includes a serial number 901 and a model name 902 of the printing apparatus 104, and pieces of information 903 to 906 for each of the ink cartridges mounted in the printing apparatus 104. The information for each ink cartridge includes the color 903, the model number 904, the ink remaining amount 905, and the unique ID (hereinafter referred to as "ink cartridge ID") 906 for identifying each ink cartridge. The ink cartridge ID 906 is an ID unique to each cartridge regardless of the color of ink contained in the ink cartridge. For example, an ink cartridge with an ink cartridge ID "CRG00001" is uniquely identified in this consumables order system.

Next, the error status information 910 will be described with reference to FIG. 9B.

The error status information 910 includes not only the serial number 901 and the model name 902 of the printing apparatus 104, but also an error code 911 indicating an error that has occurred in the printing apparatus 104, an error status 912, and error-associated additional information 913. For example, if a printhead error has occurred, the error-associated additional information 913 includes an ink cartridge ID for an ink cartridge in which the error has occurred. If no error has occurred in the printing apparatus 104, the error code 911, the error status 912, and the error-associated additional information 913 are not included in the error status information. If a plurality of errors has occurred in the printing apparatus 104, the error code 911, the error status 912, and the error-associated additional information 913 for each of the errors are included in the error status information.

Referring again to FIG. 8, the description of processing in the flowchart is continued.

In step S802, the printing apparatus management server 103 determines whether the error status information 910 in the printer status includes a printhead error. If the printing apparatus management server 103 determines that the error status information 910 does not include a printhead error (NO in step S802), the processing proceeds to step S803.

In step S803, the printing apparatus management server 103 sets the ink remaining amount 905 as a transmission ink remaining amount 1003 to be transmitted to the retailer server 102. The transmission ink remaining amount 1003 to be transmitted to the retailer server 102 will now be described with reference to FIG. 10A.

FIG. 10A is a diagram illustrating transmission ink remaining amount information 1000 to be transmitted to the retailer server 102.

The transmission ink remaining amount information 1000 includes a serial number 1001 of the printing apparatus 104, a consumables ID 1002, and a transmission ink remaining amount 1003 corresponding to the consumables ID.

In step S803 described above, the printing apparatus management server 103 sets the serial number 901 of the printing apparatus 104 as the serial number 1001 of the printing apparatus 104 in the transmission ink remaining amount information 1000, sets the ink cartridge ID 906 as the consumables ID 1002, and sets the ink remaining amount 905 as the transmission ink remaining amount 1003.

Next, in step S804, the printing apparatus management server 103 transmits the transmission ink remaining amount information 1000 to the retailer server 102, and then the processing of this flowchart ends.

On the other hand, if the printing apparatus management server 103 determines that the error status information 910 includes a printhead error (YES in step S802), the processing proceeds to step S805.

In step S805, the printing apparatus management server 103 directly sets the ink remaining amount 905 to the transmission ink remaining amount 1003 for an ink cartridge (also referred to as an ink tank) with no printhead error, and sets a value that is less than or equal to a threshold defined in advance for each ink cartridge in FIG. 5 to the transmission ink remaining amount 1003 for an ink cartridge with a printhead error. For example, "0%" is set as the transmission ink remaining amount 1003 for an ink cartridge with a printhead error.

Next, in step S806, the printing apparatus management server 103 transmits the transmission ink remaining amount information 1000 set in step S805 described above to the retailer server 102.

Next, in step S807, the printing apparatus management server 103 determines whether the transmission ink remaining amount is transmitted to the retailer server 102 the number of times equal to the value set in the item 505 as the number of times of transmission without errors and variations. If the printing apparatus management server 103 determines that the transmission ink remaining amount is not transmitted to the retailer server 102 the number of times of transmission without errors and variations (NO in step S807), the printing apparatus management server 103 repeatedly performs the processing of step S806.

On the other hand, if the printing apparatus management server 103 determines that the transmission ink remaining amount is already transmitted to the retailer server 102 the number of times of transmission without errors and variations (YES in step S807), the processing of this flowchart ends.

As described above, in the present exemplary embodiment, if the printing apparatus management server 103 obtains the printer status including a printhead error status from the printing apparatus 104, information about the transmission ink remaining amount of the ink tank in which a printhead error has occurred can be transmitted to the retailer server 102 the number of times of transmission without errors and variations when the transmission ink remaining amount is below the threshold.

<Delivery Process of Ink Cartridge>

Next, a flow of processing in which the retailer server 102 that has received ink remaining amount information from the printing apparatus management server 103 determines the ink remaining amount and performs consumables order processing will be described with reference to FIG. 11.

FIG. 11 is a flowchart illustrating processing in which the retailer server 102 that has received ink remaining amount information from the printing apparatus management server 103 determines the ink remaining amount and performs consumables order processing according to the first exemplary embodiment. The processing illustrated in FIG. 11 is performed by, for example, the CPU 301 of the retailer server 102 reading out programs stored in the storage device 302 into the memory 303 and executing the programs.

In step S1101, upon receiving ink remaining amount information from the printing apparatus management server 103, the retailer server 102 stores the received ink remaining amount information in an ink remaining amount history table illustrated in FIG. 12 in the database 309 of the retailer server 102. The ink remaining amount history table will now be described.

FIG. 12 illustrates an example of an ink remaining amount history table 1200 stored in the database 309 of the retailer server 102.

The ink remaining amount history table 1200 includes items 1201 to 1204.

The items 1201, 1202, and 1204 respectively correspond to the serial number 1001 of the printing apparatus 104, the consumables ID 1002 of corresponding consumables, and the corresponding ink remaining amount 1003, which are included in the ink remaining amount information received from the printing apparatus management server 103.

The item 1203 corresponds to a date and time when ink remaining amount information is received from the printing apparatus management server 103.

Next, the retailer server 102 performs the subsequent processing (steps S1102 to S1106) for each consumables ID included in the received ink remaining amount information. Specifically, the processing of steps S1102 to S1106 is repeatedly executed the number of times equal to the number of ink cartridges for respective ink colors. This processing will be described in detail below. The retailer server 102 performs processing on consumables IDs for which processing has not been performed among the consumables IDs included in the ink remaining amount information received in step S1101 described above, and then the processing proceeds to step S1103.

In step S1103, the retailer server 102 obtains, from the consumables information 500 illustrated in FIG. 5, a threshold for the ink remaining amount corresponding to the processing target consumables ID and the number of times of transmission without errors and variations.

Next, in step S1104, the retailer server 102 obtains the ink remaining amount information corresponding to the processing target consumables ID from the ink remaining amount history table illustrated in FIG. 12, and determines whether the ink remaining amounts corresponding to the latest number of times of transmission without errors and variations are continuously below the threshold. If some of the ink remaining amounts corresponding to the latest number of times of transmission without errors and variations are not below the threshold (NO in step S1104), the processing returns to step S1102 and the retailer server 102 controls the processing to be performed on the next consumables ID.

On the other hand, if the retailer server 102 determines that the ink remaining amounts corresponding to the latest number of times of transmission without errors and variations are continuously below the threshold (YES in step S1104), the processing proceeds to step S1105.

In step S1105, the retailer server 102 obtains data matching the serial number of the printing apparatus 104 and the consumables ID included in the ink remaining amount information received from the printing apparatus management server 103 from data registered in a consumables order management table illustrated in FIG. 13. The consumables order management table will now be described with reference to FIG. 13.

FIG. 13 is a diagram illustrating an example of a consumables order management table 1300 stored in the database 309 of the retailer server 102.

The consumables order management table 1300 is a table for managing the placement of orders for consumables, and stores a serial number 1301 of the printing apparatus 104, a consumables ID 1302, a product code 1303, and a consumables delivery status 1304 in association with each other.

In step S1105, the retailer server 102 determines whether order status information in the data matching the serial number of the printing apparatus 104 and the consumables ID indicates "undelivered" (i.e., consumables are not delivered yet). If the retailer server 102 determines that the order status information indicates "undelivered" (i.e., consumables are not delivered yet) (YES in step S1105), the processing proceeds to step S1106.

In step S1106, the retailer server 102 obtains the user ID associated with the serial number included in the ink remaining amount information received from the printing apparatus management server 103 and an address of the user corresponding to the user ID from a user management table 1400 and a printing apparatus and user management table 1410 illustrated in FIGS. 14A and 14B, respectively, to be described below, and performs order processing for placing an order for a product with a product code corresponding to the consumables ID registered in the consumables order management table 1300. After the processing of step S1106, the retailer server 102 controls the processing to be performed on the next consumables ID.

On the other hand, if the order status information indicates "delivered" (i.e., consumables are already delivered) (NO in step S1105), the processing returns to step S1102 and the retailer server 102 controls the processing to proceed to processing on the next consumables ID.

If the retailer server 102 determines that the above-described processing of steps S1102 to S1106 is repeatedly executed the number of times corresponding to the number of consumables IDs (the number of ink cartridges) included in the ink remaining amount information received from the printing apparatus management server 103, the processing of this flowchart ends.

In step S1101 described above, the ink remaining amount information stored in the ink remaining amount history table 1200 in the database 309 of the retailer server 102 may be configured to be checked from an application or the like of the terminal apparatus 101 according to the present exemplary embodiment.

At a timing when the order processing in step S1106 described above is performed, the retailer server 102 may issue a notification, an email, or the like to the application or the like of the terminal apparatus 101 according to the present exemplary embodiment to indicate that, for example, the remaining amount of ink has been low, or an order has been placed.

The user management table 1400 stored in the database 309 of the retailer server 102 will be described below with reference to FIG. 14A.

Figures 14A, 14B:
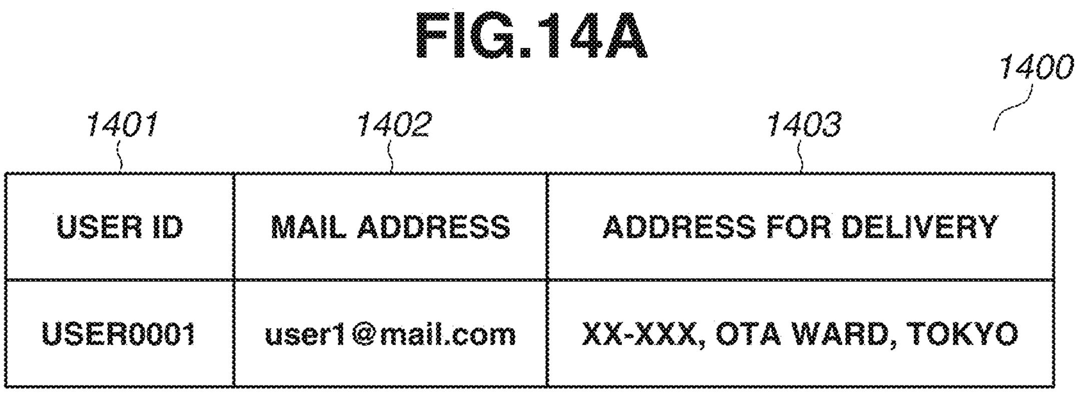
FIGS. 14A and 14B are diagrams each illustrating a user management table held in the retailer server.

FIG. 14A is a diagram illustrating an example of the user management table 1400.

The user management table 1400 stores information to be used, when use of the consumables automatic delivery service is started. Specifically, a user ID 1401 of a contractor, an address for delivery 1403 of consumables, and an e-mail address 1402 are stored in association with each other.

Next, a printing apparatus and user management table 1410 stored in the database 309 of the retailer server 102 will be described with reference to FIG. 14B.

FIG. 14B is a diagram illustrating an example of the printing apparatus and user management table 1410.

In the printing apparatus and user management table 1410, for example, a user ID 1412 of the contractor for the consumables automatic delivery service and a serial number 1411 of the printing apparatus 104 are recorded in association with each other at the timing of step S704 illustrated in FIG. 7.

After the printing apparatus management server 103 transmits, to the retailer server 102, information about the remaining amount that falls below the threshold for a prescribed number of times as the ink remaining amount of the ink cartridge in which a printhead error has occurred, the printing apparatus management server 103 may be configured to not transmit the ink remaining amount of the ink cartridge to the retailer server 102 before it is confirmed that the printhead error is resolved. This configuration makes it possible to prevent information about the ink remaining amount that falls below the threshold from being transmitted the prescribed number of times to the retailer server 102 over and over again, if the printer status including a printhead error for the same ink cartridge is repeatedly received from the printing apparatus 104.

The confirmation of whether the printhead error is resolved is made by receiving a printer status including no printhead error for the ink cartridge from the printing apparatus 104.

After the printhead error has occurred, if the ink cartridge in which the printhead error has occurred is replaced with another ink cartridge, and the printhead error is resolved, the printing apparatus 104 may transmit a printer status including information indicating that the printhead error is resolved to the printing apparatus management server 103. In this case, the printing apparatus management server 103 may confirm that the printhead error is resolved based on receiving the printer status including information indicating that the printhead error is resolved.

Effects of Present Exemplary Embodiment

According to the present exemplary embodiment, the automatic consumables delivery service makes it possible to place an order for consumables even in a case where a failure occurs in a printhead with which the consumables (ink cartridge) is integrated. In other words, consumables can be automatically ordered even when a failure occurs in the printhead. This configuration makes it possible to order a replacement ink cartridge, when a failure occurs in the printhead of the ink cartridge and printing cannot be performed even before the ink remaining amount of the ink cartridge falls below the threshold.

In the present exemplary embodiment, ink is described as an item to be ordered. However, the item to be ordered is not limited to ink, and any other item may be set as an item to be ordered, as long as the item can be contained as a recording material in a cartridge, which is an example of consumables. For example, toner may be set as an item to be ordered. In this case, assume that a toner remaining amount is used in place of the ink remaining amount and a printing error due to a toner cartridge is used in place of the printhead error. This configuration makes it possible to place an order for a replacement toner cartridge, when some failure occurs in a toner cartridge integrated with a photosensitive drum or the like and printing cannot be performed even before the toner remaining amount of the toner cartridge falls below the threshold.

The first exemplary embodiment described above illustrates a configuration in which when a failure occurs in consumables, for example, when a printhead error occurs, information about the ink remaining amount that falls below the threshold for order is transmitted from the printing apparatus management server 103 to the retailer server 102 the number of times of transmission without errors and variations, and the retailer server 102 places an order for consumables based on the transmitted information. A second exemplary embodiment illustrates a configuration in which when a printhead error occurs, the printing apparatus management server 103 further issues a notification about placement of an order for an ink cartridge due to the printhead error to the printing apparatus 104.

In the second exemplary embodiment, a description of the content common to that of the first exemplary embodiment is omitted as appropriate, and differences between the second exemplary embodiment and the first exemplary embodiment will be mainly described.

<Process of Transmitting Ink Remaining Amount Information According to Second Exemplary Embodiment>

A flow of processing of transmitting ink remaining amount information obtained by the printing apparatus management server 103 from the printing apparatus 104 to the retailer server 102 will be described with reference to FIG. 15.

Figure 15:
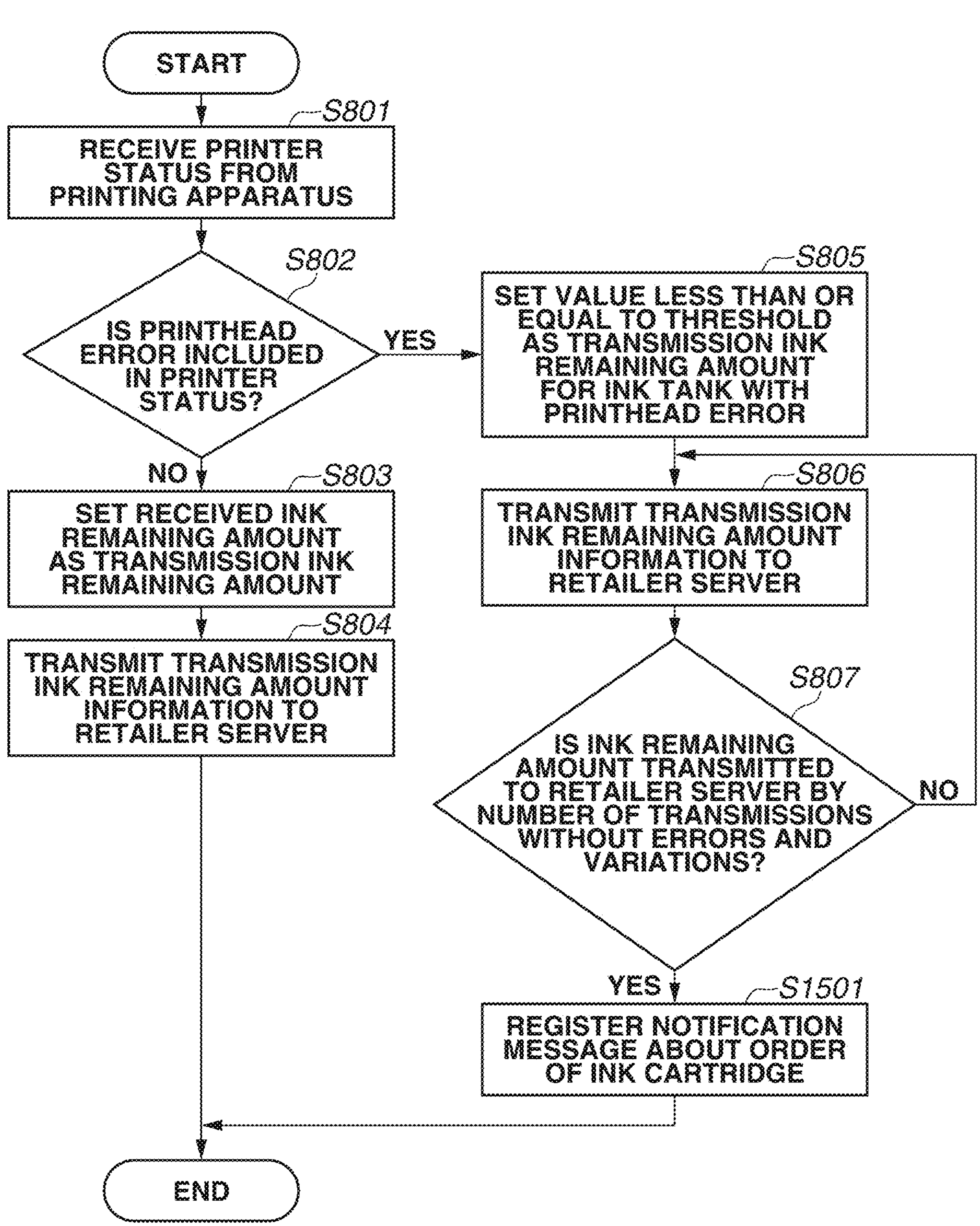
FIG. 15 is a flowchart illustrating ink remaining amount information transmission processing to be performed by the printing apparatus management server according to a second exemplary embodiment.

FIG. 15 is a flowchart illustrating an example of processing for transmitting ink remaining amount information obtained by the printing apparatus management server 103 from the printing apparatus 104 to the retailer server 102 according to the second exemplary embodiment. The processing illustrated in FIG. 15 is implemented by, for example, the CPU 301 of the printing apparatus management server 103 reading out programs stored in the storage device 302 into the memory 303 and executing the programs. The processing illustrated in FIG. 15 is started, for example, when printer status information including an ink remaining amount is transmitted from the printing apparatus 104 at a timing when some operation is performed on the printing apparatus 104, for example, at a timing when printing processing or copying processing is executed by the printing apparatus 104, at a timing when the printing apparatus 104 is switched from the power-off state to the power-on state, or at a timing when the cover of the printing apparatus 104 is opened.

Steps in FIG. 15 that are identical to the steps in FIG. 8 are denoted by the same step numbers, and step S1501 is newly added in the second exemplary embodiment. In the second exemplary embodiment, if the result of determination by the printing apparatus management server 103 in step S807 indicates "YES", the processing proceeds to step S1501.

In step S1501, the printing apparatus management server 103 registers information for providing a notification about an ink cartridge order message to the printing apparatus 104 in a message management table illustrated in FIG. 16. The message management table will now be described.

FIG. 16 is a diagram illustrating an example of a message management table 1600.

The message management table 1600 is a table registered in the database 309 of the printing apparatus management server 103.

The message management table 1600 includes items such as a message ID 1601, a generation date and time 1602 when a message is generated, identification information 1603 about the printing apparatus 104 to which the message is transmitted, and a title 1604 and content 1605 of the message. The message management table 1600 also includes items such as a display period 1606 during which the message can be displayed on the printing apparatus 104, and a status 1607 indicating whether the message is displayed on the printing apparatus 104. The status 1607 indicates "unread" when a message is registered.

Figure 17:
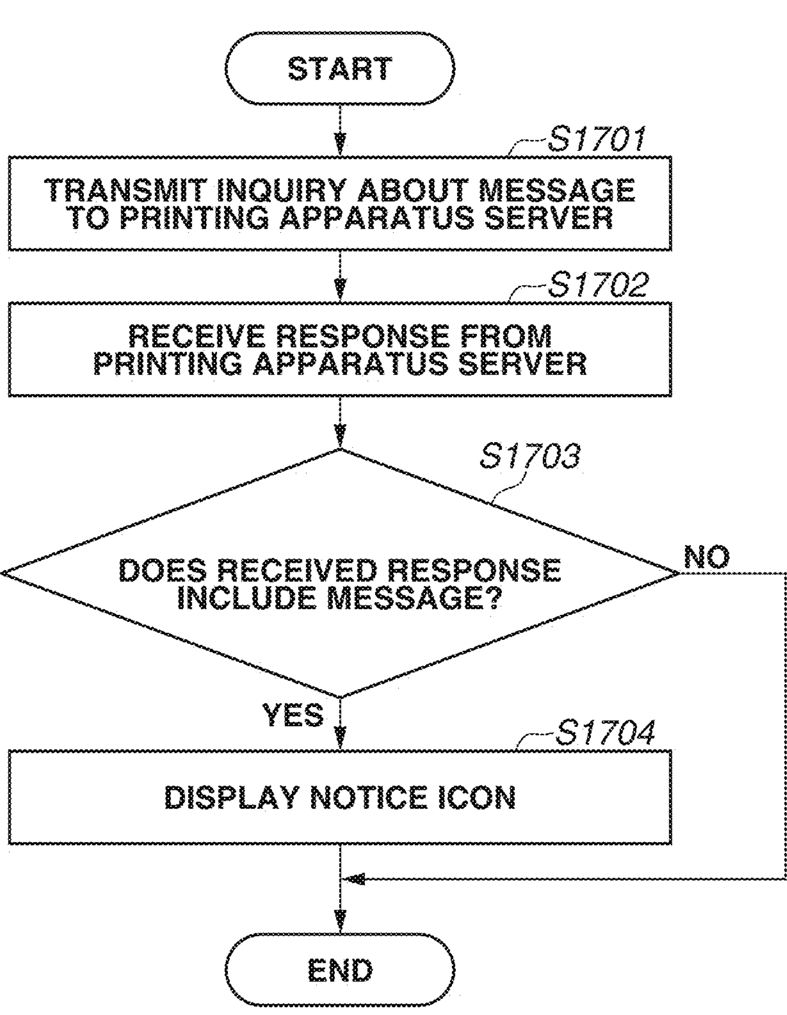
FIG. 17 is a flowchart illustrating message obtaining processing to be performed by the printing apparatus.

FIG. 17 is a flowchart illustrating an example of processing for obtaining a message generated in the printing apparatus management server 103 by the printing apparatus 104. The processing illustrated in FIG. 17 and processing illustrated in FIG. 18 to be described below are implemented by, for example, the CPU 405 of the printing apparatus 104 reading out programs stored in the program memory 406 into the working memory 407 and executing the programs.

In step S1701, the CPU 405 of the printing apparatus 104 transmits an inquiry about whether an instruction to display a message for the printing apparatus 104 is present to the printing apparatus management server 103. The printing apparatus 104 transmits this inquiry to the printing apparatus management server 103 at regular intervals. Alternatively, the printing apparatus 104 may transmit this inquiry at a timing when some operation is performed on the printing apparatus 104, for example, at a timing when printing processing or copying processing is executed by the printing apparatus 104, at a timing when the printing apparatus 104 is switched from the power-off state to the power-on state, or at a timing when the cover of the printing apparatus 104 is opened.

Upon receiving the inquiry from the printing apparatus 104, the CPU 301 of the printing apparatus management server 103 checks whether a message for the printing apparatus 104 is included in the message management table 1600, whether the display period has not expired, and whether the status indicates "unread". If a message for the printing apparatus 104 is present, the display period has not expired, and the status indicates "unread", the CPU 301 of the printing apparatus management server 103 transmits message information with the latest generation date and time 1602 as a response to the inquiry. The message information includes data (1601, 1604, and 1605) on the corresponding message in the message management table 1600 and a transmission date and time. If there is no instruction to display the message on the printing apparatus 104, or if the display period has expired or the status does not indicate "unread" (indicates "already-read"), the CPU 301 of the printing apparatus management server 103 transmits information indicating that the inquiry has been normally received as a response to the inquiry.

Next, in step S1702, the CPU 405 of the printing apparatus 104 receives the response to the inquiry from the printing apparatus management server 103, and then the processing proceeds to step S1703.

In step S1703, the CPU 405 of the printing apparatus 104 determines whether the received response includes a message. If the CPU 405 of the printing apparatus 104 determines that the received response does not include any message (NO in step S1703), the processing of this flowchart ends.

On the other hand, if the CPU 405 of the printing apparatus 104 determines that the received response includes a message (YES in step S1703), the processing proceeds to step S1704.

In step S1704, the CPU 405 of the printing apparatus 104 displays an icon (e.g., an icon 1902 illustrated in FIG. 19A) to inform that a message from the printing apparatus management server 103 is present on a user interface (UI) screen displayed on the display unit 408 of the printing apparatus 104.

Figure 19A:
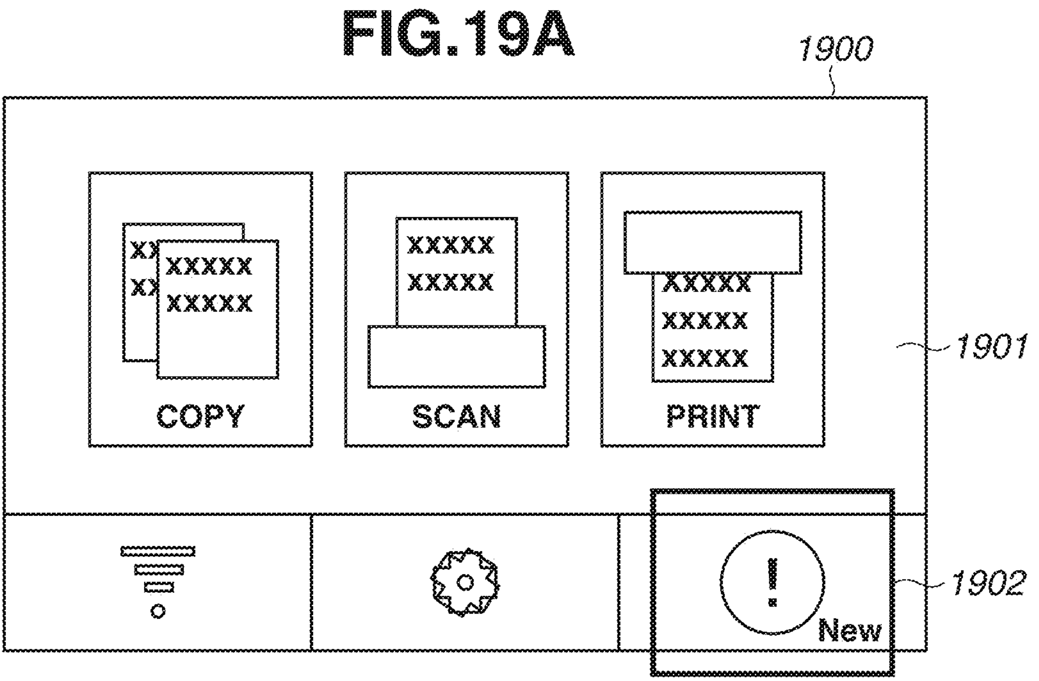
FIGS. 19A and 19B are diagrams each illustrating a user interface (UI) screen to be displayed by the printing apparatus.

FIG. 19A is a diagram illustrating an example of the UI screen to inform that a message from the printing apparatus management server 103 is present.

If the message is transmitted from the printing apparatus management server 103, the icon 1902 is displayed on a UI screen 1900. In a display area where the icon 1902 is displayed, the display of the icon 1902 is maintained even when a display 1901 on the UI screen 1900 is changed.

Figure 18:
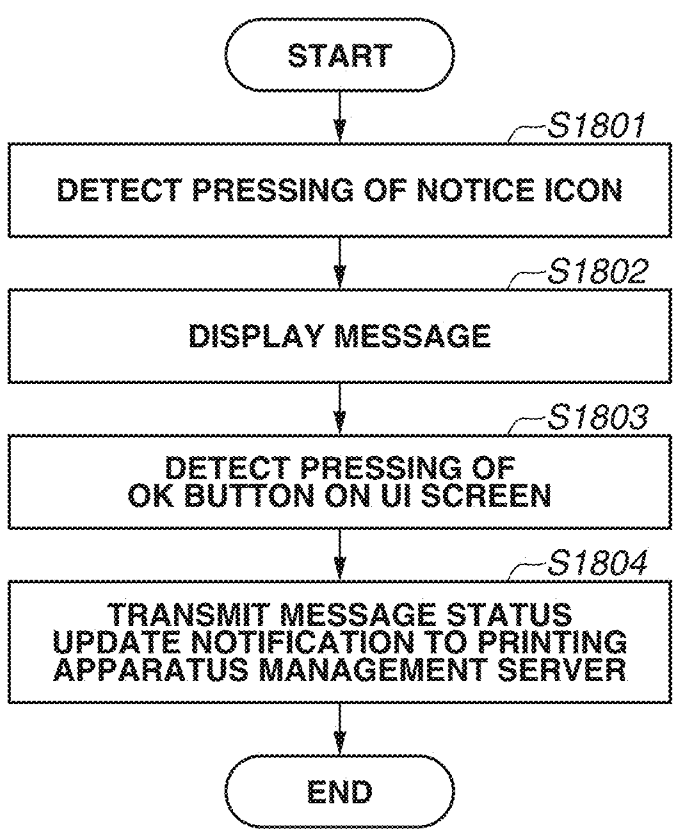
FIG. 18 is a flowchart illustrating message display processing to be performed by the printing apparatus.

FIG. 18 is a flowchart illustrating an example of processing in which the printing apparatus 104 displays a message.

In step S1801, the CPU 405 of the printing apparatus 104 detects pressing of the icon 1902 (notice icon) display on the UI screen of the display unit 408 by the user, and then the processing proceeds to step S1802.

In step S1802, the CPU 405 of the printing apparatus 104 displays a message received from the printing apparatus management server 103 on the display unit 408.

Figure 19B:
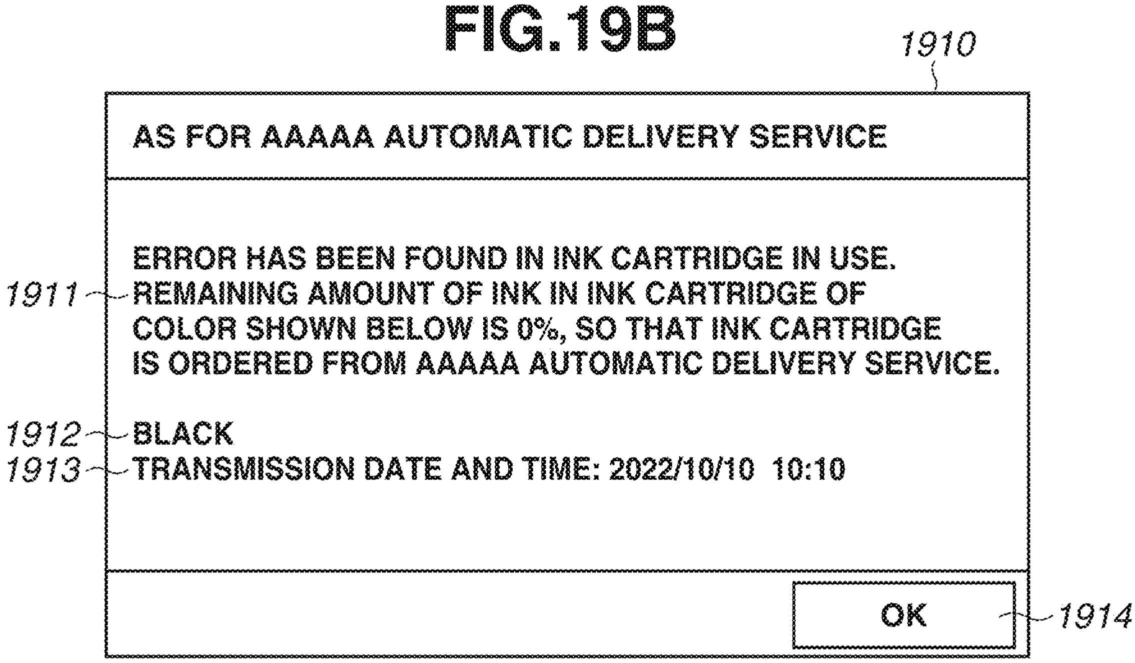

FIG. 19B is a diagram illustrating an example of a UI screen 1910 displayed on the display unit 408 of the printing apparatus 104 to display a message to inform the placement of an order for an ink cartridge.

A message 1911 is a message about the placement of an order for an ink cartridge. A color name 1912 indicates the color name of the ink cartridge to be ordered. A transmission date and time 1913 is a date and time when the message is transmitted from the printing apparatus management server 103. The message illustrated in FIG. 19B is merely an example, and the message is not limited to this example.

Referring again to FIG. 18, the description of processing in the flowchart is continued.

In step S1803, the CPU 405 of the printing apparatus 104 detects pressing of an OK button 1914 (notice check button) displayed on the UI screen 1910 of the display unit 408 by the user, and then the processing proceeds to step S1804.

In step S1804, the CPU 405 of the printing apparatus 104 issues a notification about update of a message status to the printing apparatus management server 103. The notification about update of the message status includes a message ID included in the message information received from the printing apparatus management server 103. If a plurality of messages is received in step S1702 illustrated in FIG. 17, a next message is displayed upon detection of pressing of the OK button 1914, and when pressing of the OK button 1914 for the last message is detected, the processing proceeds to step S1804. In this case, the update notification includes message IDs of all displayed messages.

Upon receiving the message status update notification, the printing apparatus management server 103 updates the message status 1607 in the message management table 1600 that matches the message ID included in the message status update notification with "already-read".

Effects of Present Exemplary Embodiment

According to the present exemplary embodiment, when a failure occurs in consumables, consumables order processing and message notification processing regarding the placement of an order for consumables upon occurrence of the failure in the consumables in the printing apparatus 104 can be performed. This configuration makes it possible to prevent the user from having an impression that the remaining amount of ink has suddenly become low when information about the ink remaining amount stored in the ink remaining amount history table 1200 in the database 309 of the retailer server 102 is checked by the user from the terminal apparatus 101. Further, even when a notification that an order has been placed is issued to the user without issuing a notification about a failure due to a printhead error to the terminal apparatus 101 from the retailer server 102, it is possible to prevent the user from having an impression that an order for an ink cartridge is suddenly placed. That is, the user's confusion due to, for example, the placement of an order for consumables from a retailer server when a failure occurs in consumables can be reduced.

A third exemplary embodiment illustrates a configuration in which the retailer server 102 receives error information from the printing apparatus management server 103 upon occurrence of an error in consumables, and places an order for consumables based on the error information. A description of the content of the third exemplary embodiment that is common to that of the first exemplary embodiment is omitted as appropriate, and differences between the third exemplary embodiment and the first exemplary embodiment will be mainly described.

In the third exemplary embodiment, assume that an administrator of the consumables management system preliminarily registers error information about consumables to be ordered immediately in the database 309 of the retailer server 102.

FIG. 20 is a diagram illustrating an example of a consumables error information management table 2000 stored in the database 309 of the retailer server 102.

The consumables error information management table 2000 stores an error code 2001, which indicates that the retailer server 102 should place an order for consumables immediately due to a failure or the like, and a message 2002 in association with each other.

FIG. 10B is a diagram illustrating an example of ink remaining amount information to be transmitted to the retailer server 102 according to the present exemplary embodiment. In the present exemplary embodiment, transmission ink remaining amount information 1010 includes error information 1011 about an ink cartridge with an error.

<Process of Transmitting Ink Remaining Amount Information According to Third Exemplary Embodiment>

A flow of processing of transmitting ink remaining amount information obtained by the printing apparatus management server 103 from the printing apparatus 104 to the retailer server 102 will be described with reference to FIG. 21.

Figure 21:
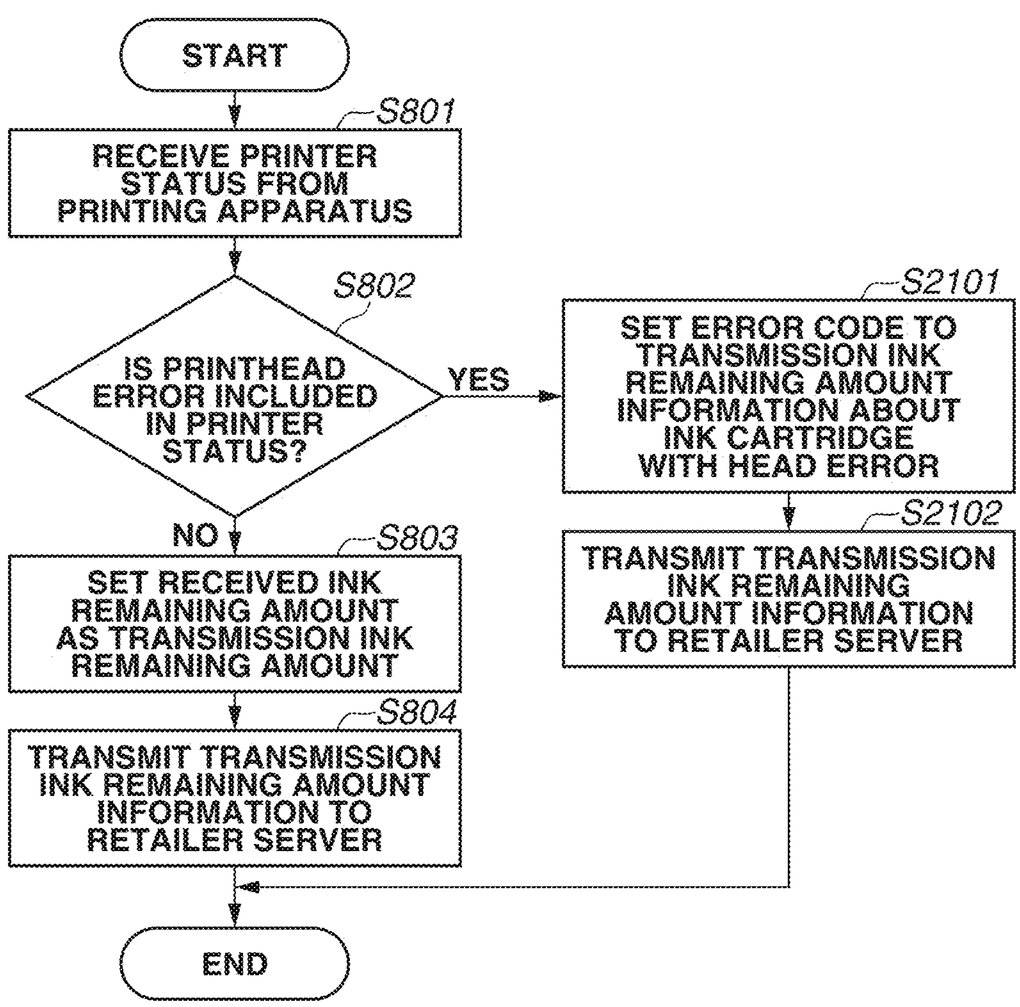
FIG. 21 is a flowchart illustrating ink remaining amount information transmission processing to be performed by the printing apparatus management server according to a third exemplary embodiment.

FIG. 21 is a flowchart illustrating an example of processing in which the printing apparatus management server 103 transmits the ink remaining amount information obtained from the printing apparatus 104 to the retailer server 102 according to the third exemplary embodiment. The processing illustrated in FIG. 21 is implemented by, for example, the CPU 301 of the printing apparatus management server 103 reading out programs stored in the storage device 302 into the memory 303 and executing the programs. The processing illustrated in FIG. 21 is started, for example, when printer status information including an ink remaining amount is transmitted from the printing apparatus 104 at a timing when some operation is performed on the printing apparatus 104, for example, at a timing when printing processing or copying processing is executed by the printing apparatus 104, at a timing when the printing apparatus 104 is switched from the power-off state to the power-on state, or at a timing when the cover of the printing apparatus 104 is opened.

Steps in FIG. 21 that are identical to the steps in FIG. 8 are denoted by the same step numbers. In the third exemplary embodiment, if the result of determination by the printing apparatus management server 103 indicates "YES" in step S802, the processing proceeds to step S2101.

In step S2101, the printing apparatus management server 103 sets an ink cartridge printhead error code received from the printing apparatus 104 to the error information 1011 corresponding to the ink consumables ID with an ink cartridge printhead error in the transmission ink remaining amount information 1010. The ink remaining amount 905 is directly set to the transmission ink remaining amount 1003 for an ink cartridge with no printhead error.

Next, in step S2102, the printing apparatus management server 103 transmits the transmission ink remaining amount information 1000 set in step S2101 described above to the retailer server 102, and then the processing of this flowchart ends.

Figure 22:
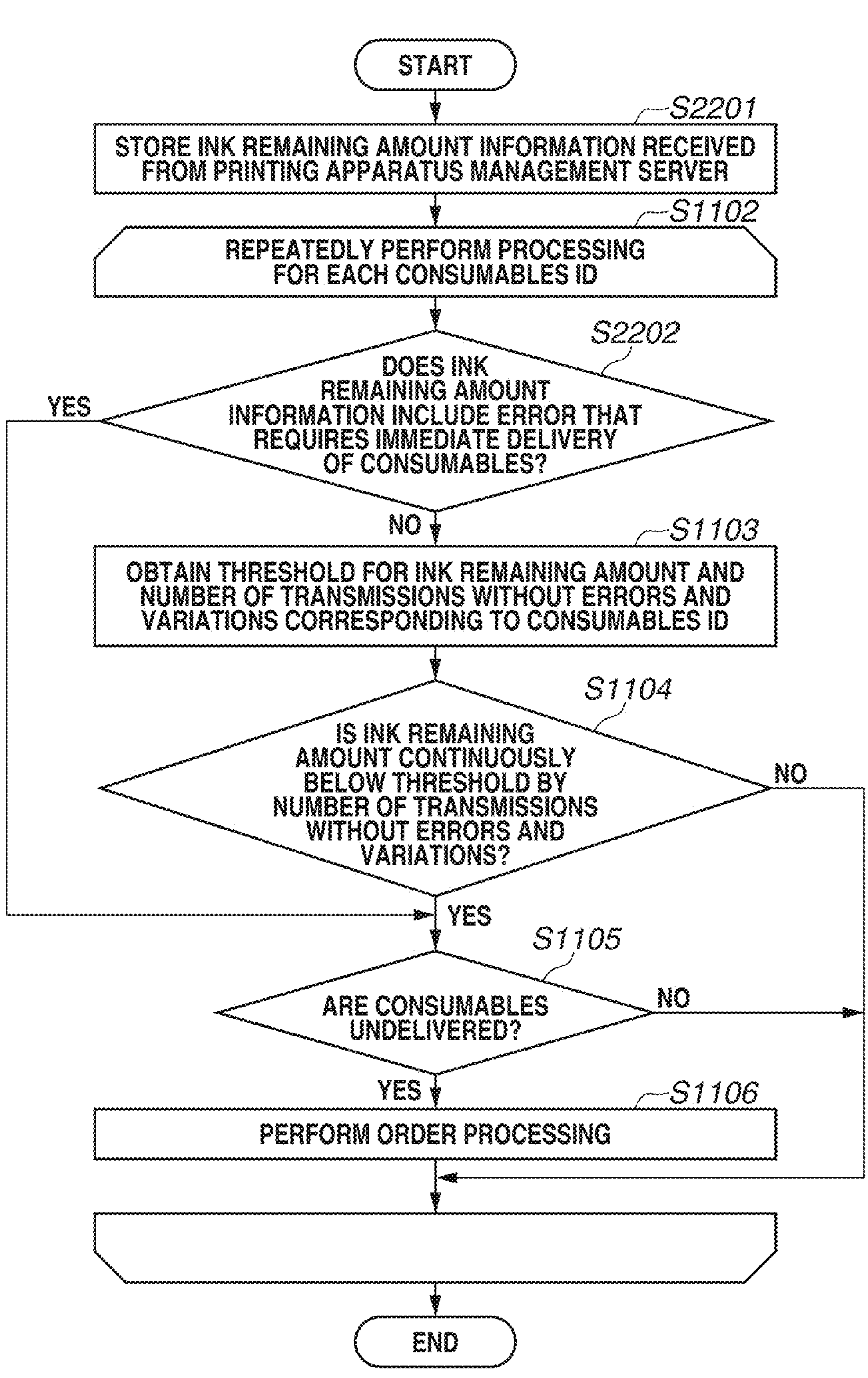
FIG. 22 is a flowchart illustrating consumables order processing to be performed by the retailer server according to the third exemplary embodiment.

FIG. 22 is a flowchart illustrating an example of processing in which the retailer server 102 performs consumables order processing according to the third exemplary embodiment. The processing illustrated in FIG. 22 is implemented by, for example, the CPU 301 of the retailer server 102 reading out programs stored in the storage device 302 into the memory 303 and executing the programs. Steps in FIG. 22 that are identical to the steps in FIG. 11 are denoted by the same step numbers.

In step S2201, upon receiving ink remaining amount information from the printing apparatus management server 103, the retailer server 102 stores the received ink remaining amount information in an ink remaining amount history table illustrated in FIG. 23 in the database 309 of the retailer server 102. The ink remaining amount history table will now be described.

FIG. 23 is a diagram illustrating an example of an ink remaining amount history table 2300 that is stored in the database 309 of the retailer server 102 and holds the ink remaining amount information received from the printing apparatus management server 103 according to the present exemplary embodiment.

The ink remaining amount history table 2300 is a table in which an item 2301 is newly added to the ink remaining amount history table 1200 in the first exemplary embodiment illustrated in FIG. 12. Items in the ink remaining amount history table 2300 that are identical to those in FIG. 12 are denoted by the same reference numerals.

The item 2301 stores information corresponding to the error information 1011 included in the ink remaining amount information received from the printing apparatus management server 103.

Next, the retailer server 102 performs the subsequent processing (S1102, S2202, and S1103 to S1106) for each consumables ID included in the received ink remaining amount information. Specifically, the processing of steps S1102, S2202, and S1103 to S1106 is repeatedly executed the number of times corresponding to the number of ink cartridges for respective ink colors. This processing will be described in detail below. The retailer server 102 performs processing on consumables IDs for which processing has not been performed among the consumables IDs included in the ink remaining amount information received in step S2201 described above, and then the processing proceeds to step S2202.

In step S2202, the retailer server 102 determines whether the error code 2001 registered in the consumables error information management table 2000 is set in the error ID 2301 corresponding to the processing target consumables ID. If the retailer server 102 determines that the error code 2001 registered in the consumables error information management table 2000 is set in the error ID 2301 corresponding to the processing target consumables ID, i.e., if the ink remaining amount information includes an error that requires immediate delivery of consumables (YES in step S2202), the processing proceeds to step S1105.

On the other hand, if the retailer server 102 determines that the error code 2001 registered in the consumables error information management table 2000 is not set in the error ID 2301 corresponding to the processing target consumables ID, i.e., if the ink remaining amount information does not include an error that requires immediate delivery of consumables (NO in step S2202), the processing proceeds to step S1103.

The ink remaining amount indicated by the ink remaining amount information 2300 stored in the database 309 of the retailer server 102 may be checked from an application or the like of the terminal apparatus 101 according to the present exemplary embodiment, and if data is included in the error code 2301 in the ink remaining amount information 2300, the message corresponding to the error code in the consumables error information management table 2000 illustrated in FIG. 20 may be displayed.

If an order is placed based on the error information at the timing of order processing, the message 2002 corresponding to the error code may be obtained from the consumables error information management table 2000 illustrated in FIG. 20, and the message 2002 may be included in a message to inform that an order has been placed by sending a notification, an email, or the like from the retailer server 102 to an application or the like of the terminal apparatus 101.

Effects of Present Exemplary Embodiment

According to the third exemplary embodiment, the retailer server 102 can receive error information from the printing apparatus management server 103 upon occurrence of an error in consumables, and can place an order for consumables based on the error information.

According to the exemplary embodiments described above, in a case where a consumables retailer server has its own order placement logic and receives information about the remaining amount of consumables from the printing apparatus management server 103 and a state where the remaining amount of consumables falls below the threshold is continuously detected the prescribed number of times, it is possible to place an order for consumables when a failure occurs in a printhead before the remaining amount of consumables integrated with the printhead falls below the threshold in a system for placing an order for consumables.

The exemplary embodiments described above illustrate an example where the retailer server 102 has order specifications in which an order for a replacement ink cartridge is placed when the ink remaining amount received from the printing apparatus management server 103 falls below the threshold the prescribed number of times. However, for example, if the retailer server 102 has different order specifications based on the ink remaining amount, the present disclosure can be applied to the order specifications by customizing the ink remaining amount information from the printing apparatus management server 103 depending on the order specifications.

The configurations and content of various data described above are not limited to these examples, and may have various configurations and content depending on the intended use and purpose.

While the exemplary embodiments have been described above, the present disclosure can take exemplary embodiments as a system, an apparatus, a method, a program, a storage medium, or the like. Specifically, the present disclosure may be applied to a system including a plurality of devices, or may be applied to an apparatus including one device.

Any configuration obtained by combining the exemplary embodiments described above can also be included in the present disclosure.

According to an aspect of the present disclosure, it is possible to place an order for an ink cartridge when a failure occurs in a printhead before an ink remaining amount of an ink cartridge integrated with the printhead falls below a threshold.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-096736, filed Jun. 13, 2023, which is hereby incorporated by reference herein in its entirety.

What is claimed is:

1. A server configured to communicate with a printing apparatus to which an ink cartridge integrated with a printhead is attached and an order system configured to perform processing for delivering a replacement ink cartridge in a case where a number of times of an ink remaining amount of the ink cartridge falls below a threshold for a prescribed number of times, the server comprising:

a transmission unit configured to transmit, to the order system, the ink remaining amount and an identifier of the ink cartridge, the ink remaining amount and the identifier being received from the printing apparatus, wherein upon receiving information about a printhead error in the ink cartridge from the printing apparatus, the transmission unit transmits, to the order system, the ink remaining amount that falls below the threshold as the ink remaining amount of the ink cartridge for the prescribed number of times.

2. The server according to claim 1, further comprising a notification unit configured to issue a notification indicating that an error has occurred in the ink cartridge and an order for an ink cartridge is to be placed to the printing apparatus in a case where the transmission unit transmits, to the order system, the ink remaining amount that falls below the threshold as the ink remaining amount of the ink cartridge the prescribed number of times.

3. The server according to claim 2, wherein the notification issued by the notification unit includes a notification indicating that the ink remaining amount of the ink cartridge in which the printhead error managed by the order system has occurred is the ink remaining amount that falls below the threshold.

4. The server according to claim 1, wherein in a case where the transmission unit transmits, to the order system, the ink remaining amount that falls below the threshold as the ink remaining amount of the ink cartridge, in which the printhead error has occurred for the prescribed number of times, the transmission unit does not transmit the ink remaining amount of the ink cartridge to the order system before it is confirmed that the printhead error is resolved.

5. The server according to claim 4, wherein confirmation of whether the printhead error is resolved is made upon receiving information indicating that the printhead error is resolved from the printing apparatus.

6. A management system comprising:

a printing apparatus to which an ink cartridge integrated with a printhead is attached; and a server configured to communicate with the printing apparatus and an order system configured to perform processing for delivering a replacement ink cartridge in a case where the number of times of an ink remaining amount of the ink cartridge falls below a threshold for a prescribed number of times, wherein the server includes a first transmission unit configured to transmit, to the order system, the ink remaining amount and an identifier of the ink cartridge, the ink remaining amount and the identifier being received from the printing apparatus, wherein the printing apparatus includes a second transmission unit configured to transmit, to the server, the ink remaining amount and the identifier of the ink cartridge attached to the printing apparatus, wherein, upon receiving information about a printhead error in the ink cartridge from the printing apparatus, the first transmission unit transmits, to the order system, the ink remaining amount that falls below the threshold as the ink remaining amount of the ink cartridge for the prescribed number of times, and wherein in a case where the printhead error has occurred in the ink cartridge, the second transmission unit transmits, to the server, the identifier of the ink cartridge and the information about the printhead error.

7. The management system according to claim 6, wherein the server further includes a notification unit configured to issue a notification indicating an error has occurred in the ink cartridge and an order for an ink cartridge is to be placed to the printing apparatus in a case where the transmission unit transmits, to the order system, the ink remaining amount that falls below the threshold as the ink remaining amount of the ink cartridge for the prescribed number of times, and wherein the printing apparatus further includes a display unit configured to display content notified by the server.

8. The management system according to claim 7, wherein the notification issued by the notification unit includes a notification indicating that the ink remaining amount of the ink cartridge in which the printhead error by the order system has occurred is the ink remaining amount that falls below the threshold.

9. The management system according to claim 6, wherein in a case where the transmission unit transmits, to the order system, the ink remaining amount that falls below the threshold as the ink remaining amount of the ink cartridge, in which the printhead error has occurred for the prescribed number of times, the transmission unit does not transmit the ink remaining amount of the ink cartridge to the order system before it is confirmed that the printhead error is resolved.

10. The management system according to claim 9, wherein in a case where the printhead error in the ink cartridge is resolved, the second transmission unit transmits, to the printing apparatus, the identifier of the ink cartridge and information indicating that the printhead error is resolved, and wherein the first transmission unit confirms that the printhead error is resolved upon receiving the information indicating that the printhead error is resolved from the printing apparatus.

11. A control method for a server configured to communicate with a printing apparatus to which an ink cartridge integrated with a printhead is attached and an order system configured to perform processing for delivering a replacement ink cartridge in a case where a number of times of an ink remaining amount of the ink cartridge falls below a threshold for a prescribed number of times, the control method comprising:

transmitting, to the order system, the ink remaining amount and an identifier of the ink cartridge, the ink remaining amount and the identifier being received from the printing apparatus; and transmitting, to the order system, the ink remaining amount that falls below the threshold as the ink remaining amount of the ink cartridge for the prescribed number of times, in a case where information about a printhead error in the ink cartridge is received from the printing apparatus.

12. A control method for a management system including a printing apparatus to which an ink cartridge integrated with a printhead is attached and a server configured to communicate with the printing apparatus and an order system configured to perform processing for delivering a replacement ink cartridge in a case where a number of times of an ink remaining amount of the ink cartridge falls below a threshold for a prescribed number of times, the control method comprising:

transmitting, by the server, the ink remaining amount and an identifier of the ink cartridge to the order system, the ink remaining amount and the identifier being received from the printing apparatus;

transmitting, by the printing apparatus, the ink remaining amount and the identifier of the ink cartridge attached to the printing apparatus to the server;

transmitting, by the printing apparatus, the identifier of the ink cartridge and information about a printhead error to the server, in a case where the printhead error has occurred in the ink cartridge; and transmitting, by the server, the ink remaining amount that falls below the threshold as the ink remaining amount of the ink cartridge to the order system for the prescribed number of times, in a case where the information about the printhead error in the ink cartridge is received from the printing apparatus.

* * * * *